(12) United States Patent
Inoue et al.

(10) Patent No.: US 10,899,619 B2
(45) Date of Patent: Jan. 26, 2021

(54) METHOD FOR PRODUCING CARBON NANOTUBE WEB, METHOD FOR PRODUCING CARBON NANOTUBE COLLECTED PRODUCT, AND APPARATUS FOR PRODUCING CARBON NANOTUBE WEB

(71) Applicants: HITACHI ZOSEN CORPORATION, Osaka (JP); YAMAHA CORPORATION, Shizuoka (JP)

(72) Inventors: Tetsuya Inoue, Osaka (JP); Norifumi Morihara, Osaka (JP); Tomoya Yamashita, Osaka (JP); Katsunori Suzuki, Shizuoka (JP); Yasuro Okumiya, Shizuoka (JP); Koji Yataka, Shizuoka (JP)

(73) Assignees: Hitachi Zosen Corporation, Osaka (JP); Yamaha Corporation, Shizuoka (JP)

( * ) Notice: Subject to any disclaimer, the term of this patent is extended or adjusted under 35 U.S.C. 154(b) by 224 days.

(21) Appl. No.: 15/743,128

(22) PCT Filed: Jun. 1, 2016

(86) PCT No.: PCT/JP2016/066179
§ 371 (c)(1),
(2) Date: Jan. 9, 2018

(87) PCT Pub. No.: WO2017/010180
PCT Pub. Date: Jan. 19, 2017

(65) Prior Publication Data
US 2019/0100435 A1    Apr. 4, 2019

(30) Foreign Application Priority Data

Jul. 10, 2015   (JP) .................................. 2015-138586

(51) Int. Cl.
*C01B 32/16*    (2017.01)
*C01B 32/168*   (2017.01)
(Continued)

(52) U.S. Cl.
CPC ............ *C01B 32/168* (2017.08); *C01B 32/16* (2017.08); *D02G 3/16* (2013.01); *B82Y 30/00* (2013.01);
(Continued)

(58) Field of Classification Search
CPC ....... C01B 32/168; C01B 32/16; B82Y 40/00; B82Y 30/00; D02G 3/16; D10B 2101/122;
(Continued)

(56) References Cited

U.S. PATENT DOCUMENTS

2010/0282403 A1    11/2010   Liu et al.
2010/0308489 A1    12/2010   Feng et al.
(Continued)

FOREIGN PATENT DOCUMENTS

JP    2005-067916 A    3/2005
JP    2009-091240 A    4/2009
(Continued)

OTHER PUBLICATIONS

PCT International Preliminary Report on Patentability with PCT Notification Concerning Transmittal of the International Preliminary Report on Patentability PCT/JP2016/066179 dated Jan. 16, 2018 with English translation.
(Continued)

*Primary Examiner* — Joseph S Del Sole
*Assistant Examiner* — Jamel M Nelson
(74) *Attorney, Agent, or Firm* — Pillsbury Winthrop Shaw Pittman, LLP

(57) ABSTRACT

The method for producing a carbon nanotube web includes preparing a carbon nanotube array disposed on a substrate,
(Continued)

the carbon nanotube array including a plurality of carbon nanotubes vertically aligned relative to the substrate; and drawing a carbon nanotube web from the carbon nanotube array so that the plurality of carbon nanotube single yarns are arranged in parallel, wherein in the step of drawing a carbon nanotube web, the carbon nanotube web is oscillated in a direction crossing both the thickness direction of the substrate and the drawing direction of the carbon nanotube web.

10 Claims, 10 Drawing Sheets

(51) Int. Cl.
  *D02G 3/16*   (2006.01)
  *B82Y 30/00*   (2011.01)
  *B82Y 40/00*   (2011.01)

(52) U.S. Cl.
  CPC ........... *B82Y 40/00* (2013.01); *C01B 2202/08* (2013.01); *D10B 2101/122* (2013.01)

(58) Field of Classification Search
  CPC .. H01B 13/30; H01B 13/282; H01B 13/0036; H01B 13/0003; H01B 1/04
  See application file for complete search history.

(56) References Cited

U.S. PATENT DOCUMENTS

| | | | |
|---|---|---|---|
| 2011/0052478 A1 | 3/2011 | Feng et al. | |
| 2012/0282453 A1* | 11/2012 | Wang | B29C 70/62 428/299.1 |
| 2014/0186550 A1 | 7/2014 | Cooper et al. | |
| 2014/0217643 A1* | 8/2014 | Nikawa | B82Y 30/00 264/299 |

FOREIGN PATENT DOCUMENTS

| | | | | |
|---|---|---|---|---|
| JP | 2010-116632 A | | 5/2010 | |
| JP | 2010-281025 A | | 12/2010 | |
| JP | 2011-46604 A | | 3/2011 | |
| JP | 2011-207646 A | | 10/2011 | |
| JP | 2011-208296 A | | 10/2011 | |
| JP | 2011207646 A | * | 10/2011 | |
| JP | 2014-116117 A | | 6/2014 | |
| JP | 2014-169521 A | | 9/2014 | |
| JP | 2014-237563 A | | 12/2014 | |
| WO | 2015/080008 A1 | | 6/2015 | |
| WO | WO-2015080008 A1 | * | 6/2015 | ............. B29C 70/14 |

OTHER PUBLICATIONS

International Search Report PCT/JP2016/066179 dated Aug. 23, 2016 with English translation.

* cited by examiner

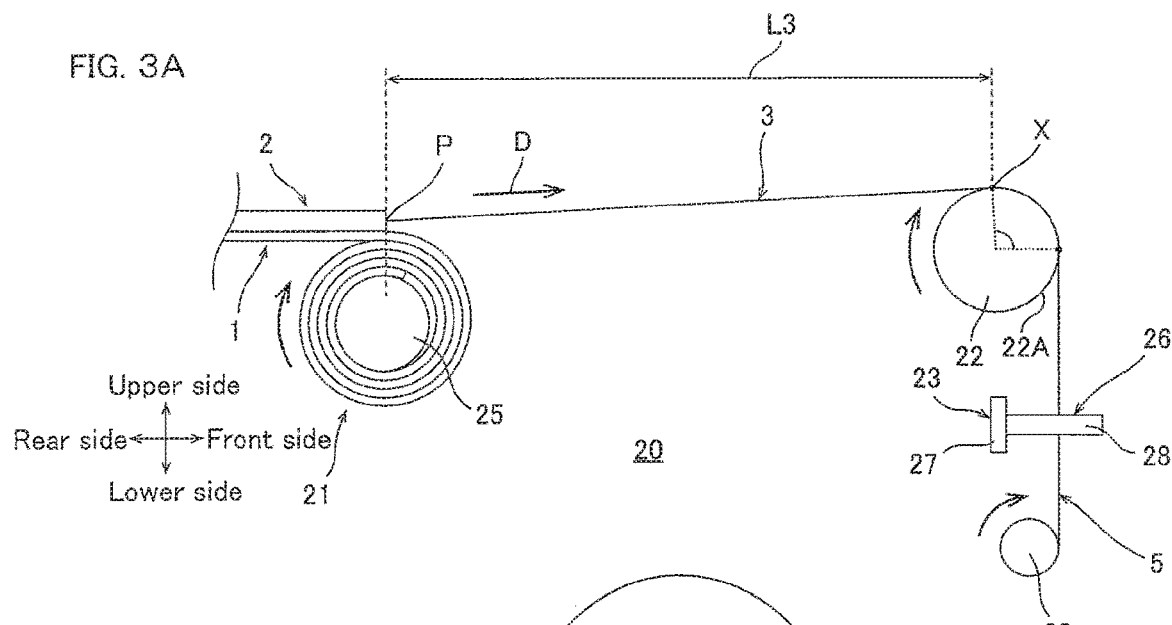
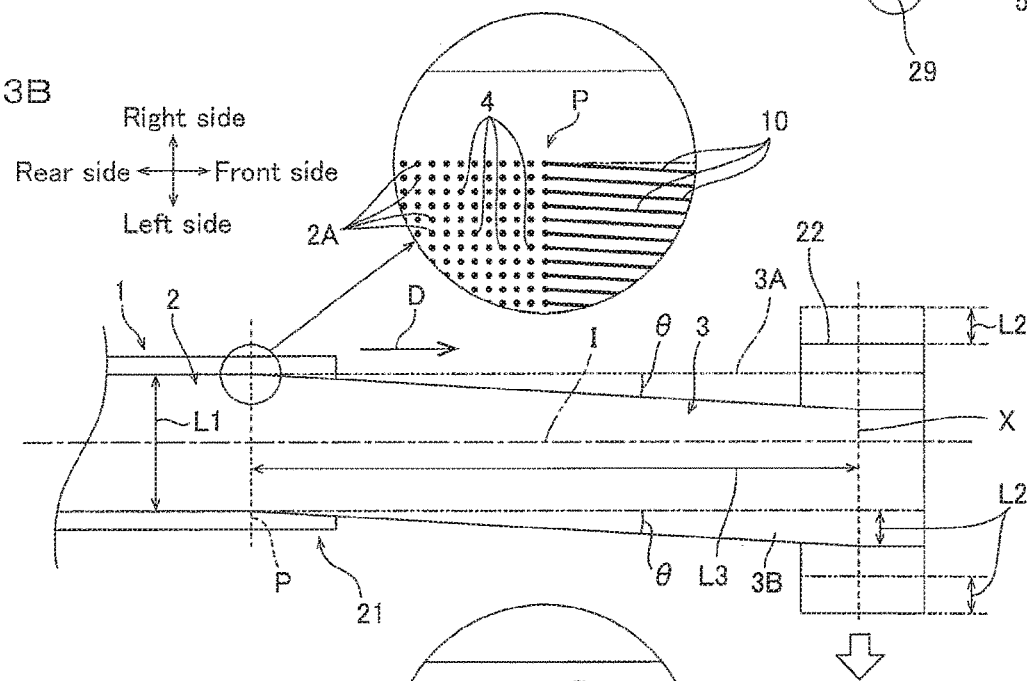
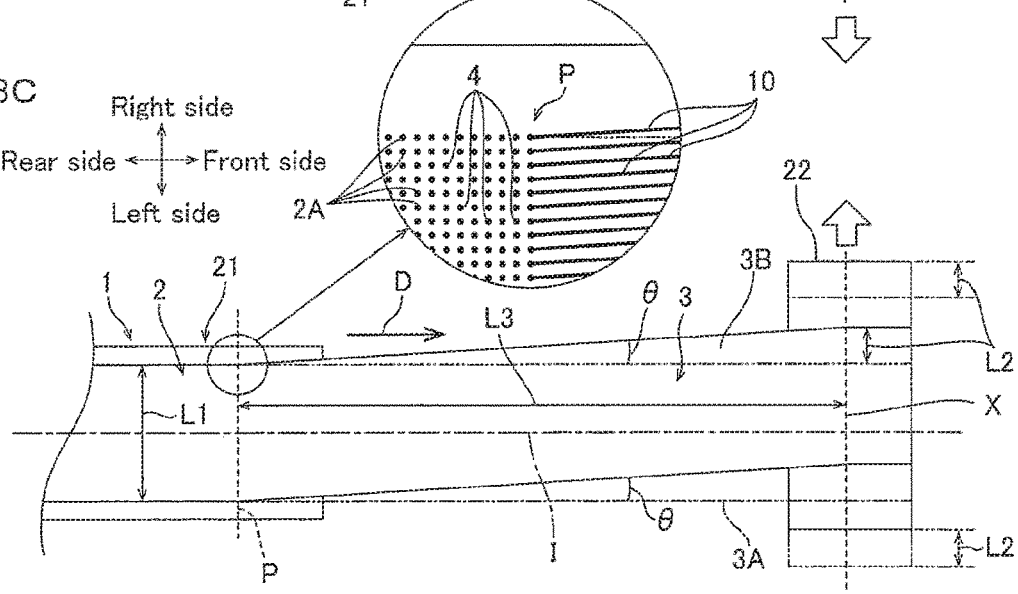

FIG. 7A
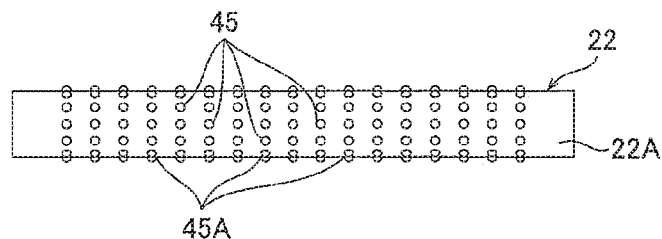
FIG. 7B
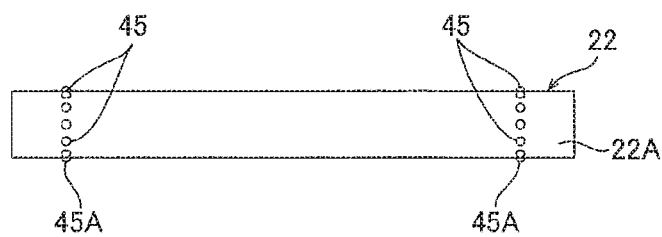
FIG. 7C
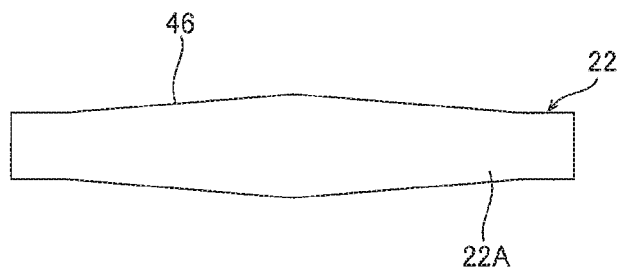
FIG. 7D       FIG. 7E
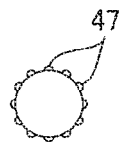 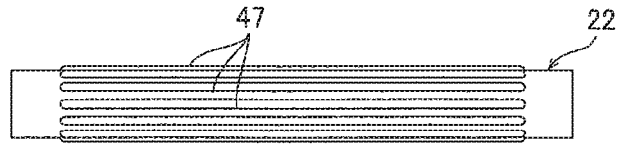

METHOD FOR PRODUCING CARBON NANOTUBE WEB, METHOD FOR PRODUCING CARBON NANOTUBE COLLECTED PRODUCT, AND APPARATUS FOR PRODUCING CARBON NANOTUBE WEB

CROSS-REFERENCE TO RELATED APPLICATIONS

This application is the U.S. National Stage of PCT/JP2016/066179, filed Jun. 1, 2016, which in turn claims priority to Japanese Patent Application No. JP 2015-138586, filed Jul. 10, 2015. The contents of each these applications are incorporated herein by reference in their entireties.

TECHNICAL FIELD

The present invention relates to a method for producing a carbon nanotube web, a method for producing a carbon nanotube collected product, and an apparatus for producing a carbon nanotube web.

BACKGROUND ART

Carbon nanotubes have been known to have excellent mechanical strength, thermal conductivity, and electrical conductivity. Since such carbon nanotubes are highly spinnable, drawing a plurality of carbon nanotubes of a carbon nanotube array into a web has been examined.

For example, Patent Document 1 below has proposed a method for producing a carbon nanotube film, in which a carbon nanotube array composed of a plurality of carbon nanotubes is grown on a substrate, and a plurality of carbon nanotubes are drawn from the carbon nanotube array on the substrate to form a carbon nanotube film.

In the method for producing a carbon nanotube film, the carbon nanotubes that are next to each other are drawn from the substrate continuously, and along with the drawing of the carbon nanotubes, the carbon nanotube arrays are separated from the substrate successively.

CITATION LIST

Patent Document
Patent Document 1:
Japanese Unexamined Patent Publication No. 2009-91240

SUMMARY

Problem to be Solved by the Invention

However, in the method for producing a carbon nanotube film of Patent Document 1, a portion of the carbon nanotube array (that is, a plurality of carbon nanotubes) may remain on the substrate without being separated from the substrate upon drawing the carbon nanotubes.

In this case, there are disadvantages in that the carbon nanotubes are not homogeneously drawn from the carbon nanotube array, and therefore density differences are caused in portions of the carbon nanotube film and homogeneity of the carbon nanotube film cannot be ensured.

Further disadvantages are that because a portion of the carbon nanotube array remains on the substrate, the portion of the carbon nanotube array cannot be used in the carbon nanotube film production and productivity of the carbon nanotube film is reduced.

Thus, an object of the present invention is to provide a method for producing a carbon nanotube web with which homogeneity of the carbon nanotube web can be improved and production efficiency can be improved; a method for producing a carbon nanotube collected product; and an apparatus for producing a carbon nanotube web.

Means for Solving the Problem

The present invention [1] includes a method for producing a carbon nanotube web, the method including the steps of:
preparing a carbon nanotube array disposed on a substrate, the carbon nanotube array including a plurality of carbon nanotubes vertically aligned relative to the substrate, and drawing a carbon nanotube web from the carbon nanotube array so that the plurality of carbon nanotube single yarns are arranged in parallel, wherein in the step of drawing a carbon nanotube web, the carbon nanotube web is oscillated in a direction crossing both the thickness direction of the substrate and the drawing direction of the carbon nanotube web.

With this method, the carbon nanotube web is drawn from the carbon nanotube array while oscillated in a direction crossing both the thickness direction of the substrate and the drawing direction of the carbon nanotube web, and therefore the oscillation of the carbon nanotube web affects on the position of drawing the carbon nanotube web from the carbon nanotube array through the plurality of carbon nanotube single yarns.

Then, at the drawing position of the carbon nanotube web, the plurality of carbon nanotubes of the carbon nanotube array reliably make contact with the surrounding neighbor carbon nanotubes.

In this fashion, the carbon nanotubes next to each other affect to be close to each other at the drawing position of the carbon nanotube web, and the plurality of carbon nanotubes can be stably drawn from the carbon nanotube array.

Therefore, homogeneity of the carbon nanotube web can be achieved, and remaining of the carbon nanotube array on the substrate can be suppressed, and production efficiency of the carbon nanotube web can be improved.

The present invention [2] includes the method for producing a carbon nanotube web of [1] above, wherein in the step of drawing a carbon nanotube web, the carbon nanotube web is oscillated by allowing the carbon nanotube web to contact a contact member, and oscillating the contact member.

With this method, in the step of drawing a carbon nanotube web, the carbon nanotube web is allowed to contact the contact member, and then the contact member is oscillated, and therefore the carbon nanotube web can be stably and reliably oscillated.

The present invention [3] includes the method for producing a carbon nanotube web of [1] above, wherein in the step of drawing a carbon nanotube web, the carbon nanotube web is oscillated by allowing the carbon nanotube web to contact the contact member, and oscillating the substrate.

With this method, in the step of drawing a carbon nanotube web, the substrate is oscillated while the carbon nanotube web is making contact with the contact member, and therefore the carbon nanotube web can be stably and reliably oscillated.

The present invention [4] includes the method for producing a carbon nanotube web of [2] or [3] above, wherein in the contact member, the surface that makes contact with the carbon nanotube web has bumps and depressions.

When the contact member or the substrate is oscillated while the carbon nanotube web is making contact with the contact member, the carbon nanotube web on the contact member slips laterally, and differences in density may be caused in portions of the carbon nanotube web.

Meanwhile, with the above-described method, the surface of the contact member has bumps and depressions, and therefore even if the contact member or the substrate is oscillated while the carbon nanotube web is making contact with the contact member, the bumps and depressions on the surface of the contact member can suppress the lateral slippage of the carbon nanotube web on the contact member. Therefore, homogeneity of the carbon nanotube web can be reliably ensured.

The present invention [5] includes the method for producing a carbon nanotube web of any one of [2] to [4] above, wherein in the contact member, the portion that makes contact with the carbon nanotube web has an inclined face that inclines toward the outer side in the contact direction with the carbon nanotube web as it approaches the inner side in the oscillating direction.

When the contact member or the substrate is oscillated while the carbon nanotube web is making contact with the contact member, the carbon nanotube web may move so as to gather at the inner side in the oscillating direction, where the oscillating is constrained.

However, with the above-described method, the contact portion of the contact member has the inclined face, and therefore even if the contact member or the substrate is oscillated while the carbon nanotube web is making contact with the contact member, the inclined face of the contact portion can suppress the gathering of the carbon nanotube web on the contact member to the inner side in the oscillating direction. Thus, homogeneity of the carbon nanotube web can be reliably ensured even more.

The present invention [6] includes the method for producing a carbon nanotube web of any one of [2] to [5] above, wherein the contact member is a roller having a cylindrical shape.

With this method, because the contact member is a roller having cylindrical shape, the carbon nanotube web can be allowed to make contact along the circumferential face of the roller.

Thus, the contact area between the carbon nanotube web and the roller can be improved. As a result, even if the roller or the substrate is oscillated while the carbon nanotube web is making contact with the roller, lateral slippage of the carbon nanotube web on the roller can be reliably suppressed.

The present invention [7] includes a method for producing a carbon nanotube collected product, the method including processing the carbon nanotube web produced by the method for producing a carbon nanotube web of any one of [2] to [6] above after allowing the carbon nanotube web to pass the contact member.

With this method, the carbon nanotube web drawn as described above is processed, after passing the contact member in unprocessed state.

That is, between the position at which the carbon nanotube web is drawn and the roller, the plurality of carbon nanotube single yarns in the carbon nanotube web are arranged in parallel in a direction crossing the direction carbon nanotube single yarns extend and this state is kept.

However, when the carbon nanotube web is processed between the position at which the carbon nanotube web is drawn and the contact member, for example, twisted together, the force derived from the processing affects the position at which the carbon nanotube web is drawn through the plurality of carbon nanotube single yarns. This may unstabilize the drawing of the carbon nanotube web.

Meanwhile, with the above-described method, the carbon nanotube web is processed after passing the contact member, and therefore the contact member suppresses effects of the force derived from the processing on the position at which the carbon nanotube web is drawn. Thus, the carbon nanotube web can be drawn stably and reliably.

The present invention [8] includes the method for producing a carbon nanotube collected product of [7] above, wherein in the step of processing the carbon nanotube web, the carbon nanotube web is twisted together to make a twisted yarn.

With this method, by a simple method of twisting the carbon nanotube web together, the carbon nanotube web can be smoothly processed to make a twisted yarn. Thus, productivity of the twisted yarn can be improved.

The present invention [9] includes the method for producing a carbon nanotube collected product of [7] above, wherein the step of processing the carbon nanotube web includes preparing a winding shaft having a cylindrical shape, winding the carbon nanotube web around the circumferential face of the winding shaft several times, and cutting the carbon nanotube web in the axis direction of the winding shaft, and forming the carbon nanotube web into a sheet shape.

With this method, by a simple method of winding the carbon nanotube web around the takeup shaft several times and cutting it, the carbon nanotube web can be smoothly processed, and a sheet (in the following, referred to as carbon nanotube stacked sheet) in which a plurality of carbon nanotube webs are stacked can be produced. Thus, productivity of the carbon nanotube stacked sheet can be improved.

The present invention [10] includes the method for producing a carbon nanotube collected product of [7] above, wherein in the step of processing the carbon nanotube web, the carbon nanotube web is immersed in a volatile liquid.

With this method, the carbon nanotube web is immersed in a volatile liquid, and therefore the vaporization of the volatile liquid causes coagulation of the plurality of carbon nanotubes in the carbon nanotube single yarn and coagulation of the plurality of carbon nanotube single yarns. Thus, the density of the carbon nanotube web can be improved.

The present invention [11] includes an apparatus for producing a carbon nanotube web including: a substrate on which a carbon nanotube array is disposed, the carbon nanotube array including a plurality of vertically aligned carbon nanotubes; a carbon nanotube web drawn from the carbon nanotube array, the carbon nanotube web drawn so that the carbon nanotube web includes a plurality of carbon nanotube single yarns arranged in parallel; and a contact member disposed at a downstream side in the drawing direction of the carbon nanotube web relative to the substrate, wherein the contact member or the substrate is oscillatable in a direction crossing both the thickness direction of the substrate and the drawing direction of the carbon nanotube web.

With such a configuration, the contact member that makes contact with the carbon nanotube web or the substrate is oscillated in a direction crossing both direction of the thickness direction of the substrate and the drawing direction of the carbon nanotube web.

Thus, by allowing the contact member to make contact with the carbon nanotube web, the carbon nanotube web is drawn out continuously from the carbon nanotube array while being oscillated in the oscillating direction of the contact member or the substrate.

Thus, homogenized carbon nanotube web can be produced successively, and remaining of the carbon nanotube array on the substrate can be suppressed, and production efficiency of the carbon nanotube web can be improved.

Effects of the Invention

With the method for producing a carbon nanotube web of the present invention, homogeneity of the carbon nanotube web can be improved, and production efficiency can be improved.

With the method for producing a carbon nanotube collected product of the present invention, carbon nanotube web can be smoothly processed, and production efficiency can be improved.

With the apparatus for producing a carbon nanotube web of the present invention, homogenized carbon nanotube web can be successively produced, and production efficiency of the carbon nanotube web can be improved.

BRIEF DESCRIPTION OF THE DRAWINGS

FIG. 3A is a schematic diagram illustrating the configuration of the spinning apparatus shown in FIG. 1. FIG. 3B is a plan view of the spinning apparatus shown in FIG. 3A, illustrating a status in which a tension roller is moved to the left side. FIG. 3C is a plan view of the spinning apparatus shown in FIG. 3A, illustrating a status in which the tension roller is moved to the right side.

FIG. 7A is a schematic diagram illustrating the configuration of a first modified example of the tension roller shown in FIG. 1. FIG. 7B is a schematic diagram illustrating the configuration of a second modified example of the tension roller shown in FIG. 1. FIG. 7C is a schematic diagram illustrating the configuration of a third modified example of the tension roller shown in FIG. 1. FIG. 7D is a schematic diagram illustrating the configuration of a fourth modified example of the tension roller shown in FIG. 1. FIG. 7E is a front view of the tension roller shown in FIG. 7D.

DESCRIPTION OF EMBODIMENTS

1. First Embodiment (1) Method for Producing a Carbon Nanotube Web

Figure 1:
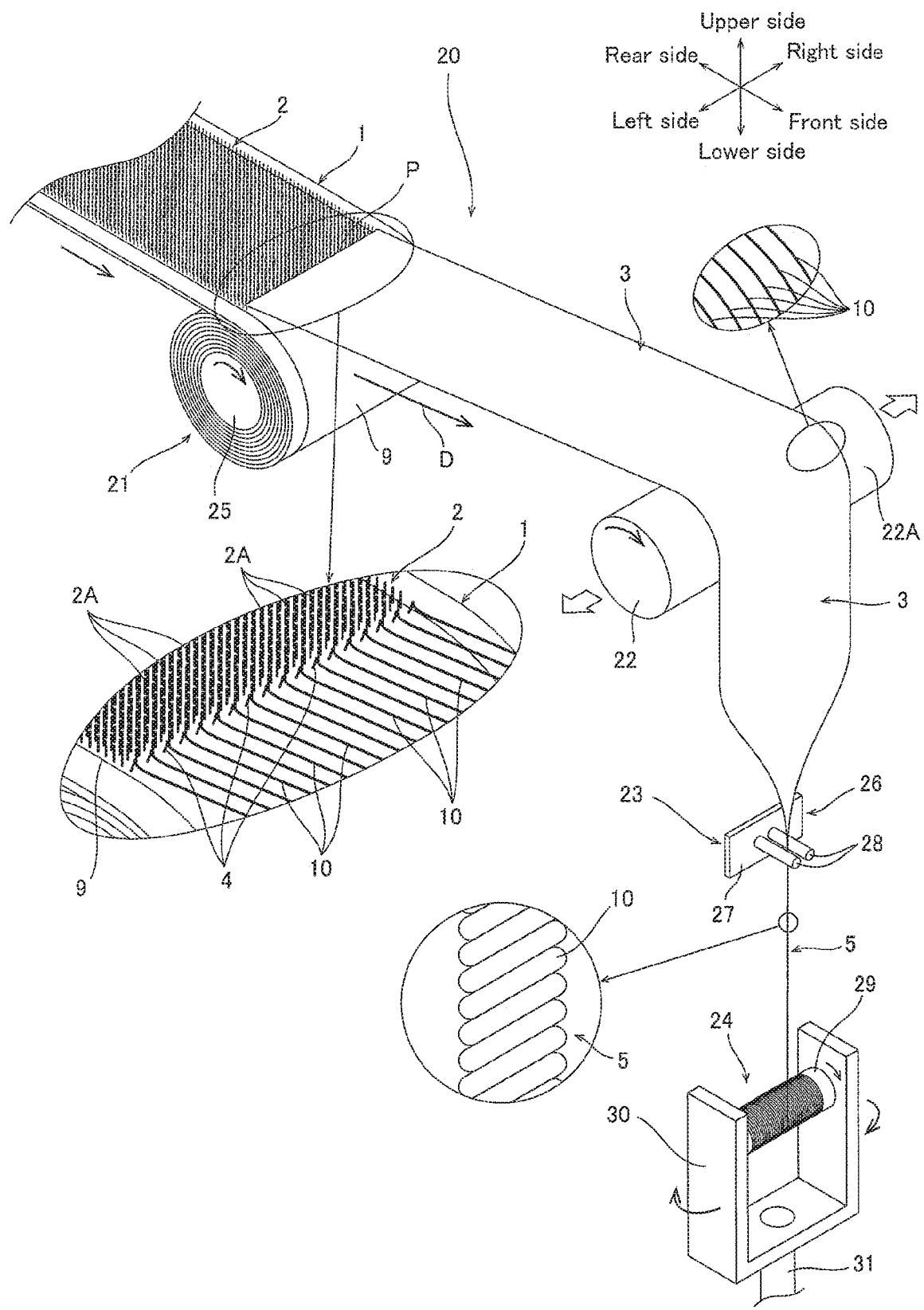
FIG. 1 is a perspective view of a spinning apparatus as a first embodiment of the apparatus for producing a carbon nanotube web of the present invention.

A first embodiment of the method for producing a carbon nanotube web of the present invention includes, for example, as shown in FIG. 1, a step of preparing a carbon nanotube array 2 disposed on a substrate 1 (preparation step), and a step of drawing a carbon nanotube web 3 from the carbon nanotube array 2 (drawing step).

In such a production method, first, the carbon nanotube array 2 disposed on the substrate 1 is prepared.

Figure 2A:
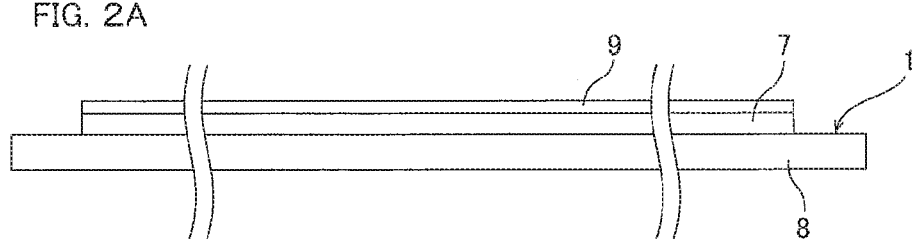
FIG. 2A is a diagram for illustrating an embodiment of the step of preparing a carbon nanotube array of FIG. 1, showing a step of forming a catalyst layer on a substrate. Following FIG. 2A.
Figure 2B:
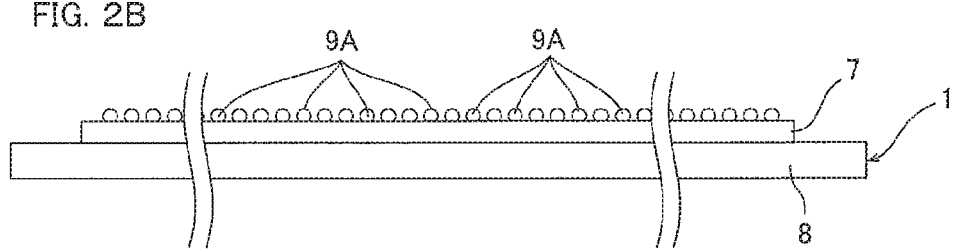
FIG. 2B shows a step of heating the substrate and having the catalyst layer aggregate into a plurality of granular bodies. Following FIG. 2B.
Figure 2C:
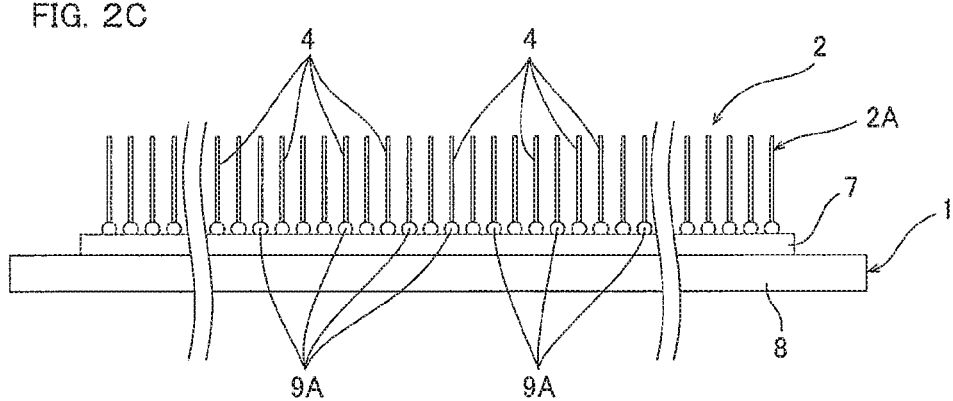
FIG. 2C shows a step of feeding a source gas to the plurality of granular bodies and growing a plurality of carbon nanotubes. Following FIG. 2C.

To prepare the carbon nanotube array 2, for example, as shown in FIG. 2A to FIG. 2C, a plurality of vertically aligned carbon nanotubes 4 are grown on the substrate 1 by chemical vapor deposition method (CVD method).

To be more specific, as shown in FIG. 2A, first, the substrate 1 is prepared. The substrate 1 is not particularly limited. The substrate 1 may be, for example, a publicly known substrate which is used for a CVD method. A commercially available item may also be used as the substrate 1. For example, the substrate 1 may be a silicon substrate, a stainless steel substrate 8 on which a silicon dioxide film 7 is stacked, etc., and may preferably be a stainless steel substrate 8 on which a silicon dioxide film 7 is stacked.

The substrate 1 is preferably elongated and has a flat belt shape in view of continuously feeding the carbon nanotube array 2 to be described later as shown in FIG. 1, and preferably is flexible in view of winding up of the substrate 1 to be described later.

Figure 2D:
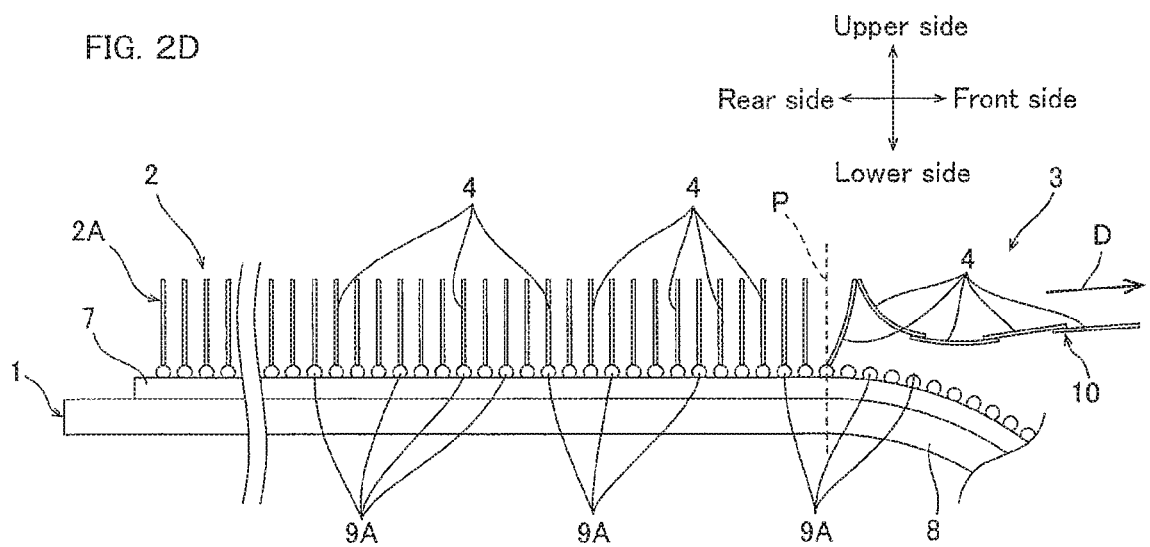
FIG. 2D shows a step of drawing a plurality of carbon nanotubes and preparing a carbon nanotube web.

In the first embodiment, the substrate 1 is a stainless steel substrate 8 on which a silicon dioxide film 7 is stacked as shown in FIG. 1 to FIG. 2D, is flexible, and has an elongated flat belt shape.

In the description below, the direction of the thickness of the substrate 1 is up-down direction, and the direction of elongation of the substrate 1 is front-back direction, and the direction of the width of the substrate 1 is left-right direction. To be specific, the directions are based on the direction arrow in the figures.

When the substrate 1 is the stainless steel substrate 8 on which the silicon dioxide film 7 is stacked, the stainless steel substrate 8 has a thickness of, for example, 20 μm or more, preferably 50 μm or more, and for example, 100 μm or less, preferably 80 μm or less, and the silicon dioxide film 7 has a thickness of, for example, 10 nm or more, preferably 100 nm or more, and for example, 1 μm or less, preferably 500 nm or less.

As shown in FIG. 2A, a catalyst layer 9 is formed on the substrate 1, preferably on the silicon dioxide film 7. To form the catalyst layer 9 on the substrate 1, a metal catalyst is formed on the substrate 1 (preferably the silicon dioxide film 7) by a known method of forming a film.

Examples of the metal catalyst include iron, cobalt, and nickel, and preferably, iron is used. Such a metal catalyst may be used singly or in a combination of two or more. The film-forming method may be, for example, vacuum deposition and sputtering, and vacuum deposition is preferable.

Accordingly, the catalyst layer 9 is disposed on the substrate 1. When the substrate 1 is the stainless steel substrate 8 on which the silicon dioxide film 7 is stacked, for example, the silicon dioxide film 7 and the catalyst layer 9 may be formed at the same time by applying a mixed solution of a silicon dioxide precursor solution and a metal catalyst precursor solution onto the stainless steel substrate 8 and phase-separating the mixed solution, and then drying it, as disclosed in Japanese Unexamined Patent Publication No. 2014-94856.

The catalyst layer 9 has a thickness (size in up-down direction) of, for example, 1 nm or more, preferably 2 nm or more, and for example, 10 nm or less, preferably 4 nm or less.

Next, the substrate 1 on which the catalyst layer 9 is disposed is heated to a temperature of 700° C. or more to 900° C. or less, as shown in FIG. 2B. Thereby, the catalyst layer 9 is aggregated to be a plurality of granular bodies 9A.

Then, as shown in FIG. 2C, a source gas is fed to the heated substrate 1. The source gas contains hydrocarbon gas with a carbon number of 1 to 4 (lower hydrocarbon gas). The hydrocarbon gas with a carbon number of 1 to 4 may be, for example, methane gas, ethane gas, propane gas, butane gas, ethylene gas, acetylene gas, etc., and acetylene gas is preferable.

The source gas may also contain hydrogen gas, inert gas (for example, helium, argon, etc.), water vapor, etc., as necessary.

When the source gas contains hydrogen gas or inert gas, the concentration of the hydrocarbon gas in the source gas may be, for example, 1 volume % or more, preferably 30 volume % or more, and for example, 90 volume % or less, preferably 50 volume % or less. The feed time of the source gas may be, for example, 1 minute or more, preferably 5 minutes or more, to 60 minutes or less, preferably 30 minutes or less.

Accordingly, the plurality of carbon nanotubes 4 grow from the plurality of granular bodies 9A. For convenience, FIG. 2C shows one carbon nanotube 4 growing from one granular body 9A. However, the present invention is not limited to this. A plurality of carbon nanotubes 4 may grow from one granular body 9A.

The plurality of carbon nanotubes 4 extend in the thickness direction (up-down direction) of the substrate 1 such that they are substantially in parallel to each other on the substrate 1. That is, the plurality of carbon nanotubes 4 are aligned in a direction orthogonal to the substrate 1 (vertically aligned).

The carbon nanotubes 4 may be a single-walled carbon nanotube or a multi-walled carbon nanotube, and a multi-walled carbon nanotube is preferable. These examples of the carbon nanotube 4 may be used singly or in a combination of two.

The carbon nanotubes 4 has an average external diameter of, for example, 1 nm or more, preferably 5 nm or more, and for example, 100 nm or less, preferably 50 nm or less, more preferably 20 nm or less.

The carbon nanotubes 4 may have an average length (an average size in the axial direction) of, for example, 1 μm or more, preferably 100 μm or more, more preferably 200 μm or more, and for example, 1,000 μm or less, preferably 500 μm or less, more preferably 400 μm or less. The number of the layers, the average external diameter, and the average length of the carbon nanotubes 4 are measured, for example, by publicly known methods such as Raman spectroscopic analysis and electron microscope observation.

Accordingly, the carbon nanotube array 2 including the plurality of carbon nanotubes 4 is formed on the substrate 1.

As shown in FIG. 1, the carbon nanotube array 2 has a thickness along up-down direction and substantially has a sheet shape extending in surface directions (the front-back direction and the left-right direction) which are orthogonal to the up-down direction). To be specific, in the left-right direction, the carbon nanotube array 2 includes a plurality of rows 2A each including the plurality of carbon nanotubes 4 which are linearly disposed along the front-back direction.

In the carbon nanotube array 2, the plurality of rows 2A are arranged in spaced-apart relation in left-right directions at an interval of, for example, 100 nm to 200 nm, and in each row 2A, the plurality of carbon nanotubes 4 are arranged in spaced-apart relation in front-back directions at an interval of, for example, 100 nm to 200 nm. In the carbon nanotube array 2, the plurality of carbon nanotubes 4 are densified in front-rear and left-right directions.

The carbon nanotube array 2 has a left-right direction size L1 of, as shown in FIG. 3B and FIG. 3C, for example, 5 mm or more, preferably 10 mm or more, even more preferably, 150 mm or more, and for example, 500 mm or less, preferably 450 mm or less.

The carbon nanotube array 2 has a bulk density of, for example, 10 mg/cm$^3$ or more, preferably 20 mg/cm$^3$ or more, and for example, 60 mg/cm$^3$ or less, preferably 50 mg/cm$^3$ or less. The bulk density of the carbon nanotube array 2 is calculated, for example, from the mass per unit area (weight per unit area: mg/cm$^2$) and the length of the carbon nanotubes (which is measured by SEM (from JEOL Corporation) or by a non-contact film thickness meter (from KEYENCE Corporation)).

Then, as shown in FIG. 1, the carbon nanotube web 3 is drawn from the carbon nanotube array 2 in a drawing direction D from the rear side to the front side while oscillating the carbon nanotube web 3 in left-right directions.

To draw the carbon nanotube web 3 from the carbon nanotube array 2 while oscillating the carbon nanotube web 3, for example, first, a tension roller 22 as an example of the contact member is prepared.

The tension roller 22 has a cylindrical shape extending in left-right directions. The external diameter of the tension roller 22 is not particularly limited, and is, for example, 1 cm or more and 20 cm or less.

The size of the tension roller 22 in left-right directions is not particularly limited as long as it is about the same as the size L1 of the carbon nanotube array 2 in left-right directions, and preferably larger than the size L1 of the carbon nanotube array 2 in left-right directions.

The tension roller 22 is disposed in front of the carbon nanotube array 2 in spaced-apart relation. That is, the tension roller 22 is disposed at a downstream side of the substrate 1 (carbon nanotube array 2) in the drawing direction D of the carbon nanotube web 3.

The distance between the tension roller 22 and the carbon nanotube array 2 is, for example, 10 cm or more and 20 cm or less.

The tension roller 22 is rotatable clockwise when it is seen from the left side around its axis, as shown in FIG. 1, and as shown in FIG. 3B and FIG. 3C, the tension roller 22 can move back and forth in left-right directions (can be oscillated).

To be more specific, the tension roller 22 is positioned, while not moving, at an initial position shown in the phantom line in FIG. 3B and FIG. 3C. When the tension roller 22 is at the initial position, the center in left-right directions (axis direction) of the tension roller 22 and the center in left-right directions of the carbon nanotube array 2 are in line along the front-back directions when viewed in up-down direction, and are positioned on the same phantom line I extending along the front-back directions.

When driven, the tension roller 22 continuously moves so as to reciprocate between a first position (ref: solid line in FIG. 3B), i.e., a left side of the initial position and a relatively the leftmost side, and a second position (ref: solid line in FIG. 3C), i.e., a right side of the initial position and a relatively the rightmost side, at a predetermined moving speed while rotating clockwise when it is seen from the left side.

That is, the tension roller 22 moves by the moving amount L2 (oscillating width L2) to the right side and the left side relative to the initial position when driven.

The moving amount L2 of the tension roller 22 is not particularly limited as long as it is the interval between the plurality of rows 2A of the carbon nanotube array 2 or more, and the size L1 of the carbon nanotube array 2 in left-right directions or less. For example, the moving amount L2 of the tension roller 22 is 1 μm or more, preferably 1 mm or more in view of controllability. For example, the moving amount L2 of the tension roller 22 is 10 mm or less, preferably 5 mm or less in view of stably drawing the carbon nanotube web 3.

The preferable moving amount L2 of the tension roller 22 relative to the size L1 of the carbon nanotube array 2 in left-right directions is, for example, 1/50 or more, preferably 1/30 or more, even more preferably 1/25 or more, and for example, 1/2 or less, preferably 1/10 or less, even more preferably 1/20 or less.

The tension roller 22 preferably moves in reciprocation to be symmetrical relative to the phantom line I passing the center in left-right directions of the tension roller 22 at the initial position. In this case, the moving amount L2 at both the left side and the right side of the tension roller 22 is the same.

The moving speed of the tension roller 22 is, for example, 0.1 m/min or more, preferably 0.5 m/min or more, even more preferably, 1 m/min or more, and for example, 100 m/min or less, preferably 10 m/min or less, even more preferably 5 m/min or less.

The moving speed of the tension roller 22 relative to the drawing speed of the carbon nanotube web 3 described later is, for example, 1/1000 or more, preferably 1/100 or more, even more preferably, 1/10 or less, and for example, 1/1 or less, preferably 1/2 or less, even more preferably 1/5 or less.

The oscillating number (reciprocation per unit time) of the tension roller 22 is, for example, 5 times/min or more, preferably 10 times/min or more, even more preferably 100 times/min or more, particularly preferably 150 times/min or more, and for example, 500 times/min or less, preferably 250 times/min or less.

Then, as shown in FIG. 1, the carbon nanotube web 3 is drawn from the carbon nanotube array 2 to allow the carbon nanotube web 3 to contact the tension roller 22.

To draw the carbon nanotube web 3 from the carbon nanotube array 2, of the carbon nanotube array 2, the carbon nanotubes 4 positioned at the front end portion of the rows 2A are collectively held by a drawing device (not shown), and then pulled in a direction which intersects (crossing) the thickness direction of the substrate 1, preferably to the front side.

Thereby, the pulled carbon nanotubes 4 are drawn out from the corresponding granular bodies 9A, as shown in FIG. 2D. At this moment, the carbon nanotubes 4 which are adjacent in front-back directions to the drawn carbon nanotubes 4 are drawn out from the corresponding granular bodies 9A because the ends (lower ends) of the drawn carbon nanotubes 4 are attached to the ends (lower ends) of the adjacent carbon nanotubes 4 by the frictional force, Van der Waals force, etc.

At this moment, one ends (lower ends) of the carbon nanotubes 4 attached to the drawn carbon nanotubes 4 are pulled downstream in the drawing direction D, and the other ends (upper ends) of the carbon nanotubes 4 are tilted upstream in the drawing direction D, causing the other ends (upper ends) of the carbon nanotubes 4 to attach to other ends (upper ends) of adjacent carbon nanotubes 4.

Subsequently, the other ends (upper ends) of the carbon nanotubes 4 attached to the drawn carbon nanotubes 4 are pulled downstream in the drawing direction D, and the one ends (lower ends) of the carbon nanotubes 4 are drawn out from the corresponding granular bodies 9A, causing the one ends (lower ends) of the carbon nanotubes 4 to attach to one ends (lower ends) of adjacent carbon nanotubes 4.

Accordingly, the plurality of carbon nanotubes 4 are successively drawn from the carbon nanotube array 2 to thereby form a carbon nanotube single yarn 10 including a plurality of continuously and linearly connected carbon nanotubes 4.

More specifically, the carbon nanotube single yarn 10 includes continuous carbon nanotubes 4 which are connected to each other by attaching their one ends (lower ends) or attaching their other ends (upper ends), and are aligned along the extension direction of the carbon nanotube single yarn 10.

For convenience, FIG. 1 and FIG. 2D illustrate one carbon nanotube 4 continuously connected to another one carbon nanotube 4 to form the carbon nanotube single yarn 10. However, actually, a bundle of the plurality of carbon nanotubes 4 is connected continuously to form the carbon nanotube single yarn 10.

The carbon nanotube single yarn 10 is an untwisted yarn which is not twisted and has a yarn shape (linear shape). That is, the twist angle of each of the carbon nanotube single yarns 10 is substantially 0°.

The carbon nanotube single yarn 10 has an external diameter of, for example, 5 nm or more, preferably 8 nm or more, and for example, 100 nm or less, preferably 80 nm or less, even more preferably 50 nm or less.

The plurality of carbon nanotube single yarns 10 are arranged in parallel in a direction intersecting (crossing) the extension direction of the carbon nanotube single yarns 10 because the carbon nanotubes 4 of the rows 2A are drawn at once simultaneously and in parallel (see the enlargement in FIG. 1).

To be specific, the plurality of carbon nanotube single yarns 10 extend in front-back directions, and arranged in parallel in left-right directions. The plurality of carbon nanotube single yarns 10 arranged in parallel in this way substantially have a sheet shape and thus constitutes the carbon nanotube web 3.

That is, the carbon nanotube web 3 is composed of the plurality of carbon nanotube single yarns 10 drawn to be arranged in parallel.

Then, the carbon nanotube web 3 is allowed to contact the tension roller 22. To be specific, the carbon nanotube web 3 is allowed to run in the circumferential direction of the tension roller 22 at the initial position so as to be positioned at the circumferential face 22A (an example of surface) of the tension roller 22.

At this moment, the carbon nanotube web 3 makes contact with the circumferential face 22A of the tension roller 22 in the range such that the central angle of the tension roller 22 is, for example, 5° to 180°, preferably 10° to 150°, even more preferably 60 to 120°, as shown in FIG. 3A.

In the portion of the carbon nanotube web 3 where it makes contact with the circumferential face 22A of the tension roller 22, the upstream end portion (clockwise upstream end portion when it is seen from the left side) in the moving direction is defined as contact upstream end portion X.

The contact upstream end portion X of the carbon nanotube web 3 is disposed at the front side in spaced-apart relation relative to the drawing position P of the carbon nanotube web 3, as shown in FIG. 3A and FIG. 3B.

The interval L3 in front-back directions between the contact upstream end portion X of the carbon nanotube web 3 and the drawing position P of the carbon nanotube web 3 is, for example, 10 cm or more and 20 cm or less.

The carbon nanotube web 3 positioned between the drawing position P and the contact upstream end portion X while the tension roller 22 is at the initial position is defined as a base carbon nanotube web 3A (ref: phantom line in FIG. 3B and FIG. 3C). The base carbon nanotube web 3A (that is, the plurality of carbon nanotube single yarns 10) extends in front-back direction viewed in up-down direction.

Then, the tension roller 22 is allowed to reciprocate in left-right directions while the substrate 1 is restricted from moving in left-right directions. At this moment, by preferably rotating the tension roller 22 clockwise when it is seen from the left side, the carbon nanotube web 3 is pulled so that a tension is applied to the carbon nanotube web 3 between the carbon nanotube array 2 and the tension roller 22.

Then, the carbon nanotube web 3 is drawn continuously from the carbon nanotube array 2 while being oscillated (shaking) in left-right directions based on the friction between the circumferential face 22A of the tension roller 22 and the carbon nanotube web 3.

That is, the tension roller 22 oscillates (reciprocative movement in left-right directions) to oscillate the carbon nanotube web 3 in the left-right directions (orthogonal direction to both of the thickness direction of the substrate 1 and the drawing direction D of the carbon nanotube web 3), i.e., the width direction of the carbon nanotube web 3. Thus, the left-right directions are an example of the oscillating direction of the carbon nanotube web 3.

The carbon nanotube web 3 at the position between the drawing position P and the contact upstream end portion X while the tension roller 22 is at the first position or the second position is defined as a oscillated carbon nanotube web 3B (ref: solid line in FIG. 3B and FIG. 3C).

The carbon nanotube single yarn 10 of the oscillated carbon nanotube web 3B is oscillated from the carbon nanotube single yarn 10 of the base carbon nanotube web 3A so as to be tilted relative to the front-back directions with the drawing position P as the fulcrum.

The carbon nanotube single yarn 10 of the base carbon nanotube web 3A and the carbon nanotube single yarn 10 of the oscillated carbon nanotube web 3B form a oscillating angle θ of an arctan (moving amount L2 of the tension roller 22/interval L3 between the contact upstream end portion X and the drawing position P) of, for example, of 0.0003° or more, preferably 0.01° or more, even more preferably 0.1° or more, and for example, 6° or less, preferably 3° or less, even more preferably 1° or less.

The carbon nanotube web 3 is drawn continuously from the carbon nanotube array 2 on the substrate 1 while being oscillated in the left-right directions in the above-described manner.

The carbon nanotube web 3 is drawn at the speed of, for example, 10 mm/min or more, preferably 100 mm/min or more, even more preferably 300 mm/min or more, and for example, 10000 mm/min or less, preferably 1000 mm/min or less, even more preferably 700 mm/min or less.

When the carbon nanotube web 3 is drawn from the carbon nanotube array 2, as shown in FIG. 2D, the plurality of carbon nanotubes 4 are drawn from the carbon nanotube array 2, and therefore the carbon nanotube array 2 is successively separated from the substrate 1 along with the drawing of the carbon nanotube web 3. Then, the drawing position P of the carbon nanotube web 3 from the carbon nanotube array 2 moves toward the upstream in the drawing direction D relative to the substrate 1.

Thus, in the drawing step of the carbon nanotube web 3, preferably, the substrate 1 is conveyed so as to move to the downstream in the drawing direction D at the drawing position P of the carbon nanotube web 3, to continuously feed the carbon nanotube array 2 to the drawing position P.

The moving speed of the substrate 1 at the drawing position P is adjusted suitably so that the drawing position P of the carbon nanotube web 3 is kept at substantially the same position at the drawing direction D, and for example, it is 0.5 mm/min or more and 1.5 mm/min or less.

Then, the substrate 1 that has passed the drawing position P and from which the carbon nanotube array 2 is separated is preferably wound up, as shown in FIG. 1. To be more specific, a takeup shaft 25 winds up and collects the substrate 1 that has passed the drawing position P.

The takeup shaft 25 has a cylindrical shape extending in left-right direction. The takeup shaft 25 is rotatable around its axis. The takeup shaft 25 is disposed in spaced apart relation at the lower side relative to the drawing position P of the carbon nanotube web 3.

After the substrate 1 that has passed the drawing position P is fixed to the takeup shaft 25, the takeup shaft 25 rotates clockwise when it is seen from the left side to give a driving force to the substrate 1 to convey and wind up the substrate 1 at the above-described moving speed.

Although not shown, preferably, the substrate 1 on which the carbon nanotube array 2 is formed can be conveyed by winding the substrate 1 around a roll shaft, and taking up the substrate 1 fed from the roll shaft by the takeup shaft 25.

The carbon nanotube array 2 can also be successively formed on the substrate 1 conveyed by roll to roll method. To be specific, a substrate 1 on which the carbon nanotube array 2 is not formed is wound around the roll shaft, and the substrate 1 is conveyed from the roll shaft to the takeup shaft 25, and between the roll shaft and the takeup shaft 25, the carbon nanotube array 2 can be formed successively on the substrate 1 being conveyed.

In the above-described manner, the carbon nanotube web 3 is continuously produced, and the substrate 1 from which the carbon nanotube array 2 is separated is continuously collected.

(2) Method for Producing a Carbon Nanotube Collected Product

Such a carbon nanotube web 3 is processed into various industrial products, for example, a carbon nanotube twisted yarn 5 and a carbon nanotube stacked sheet 6 (ref: FIG. 5B).

In the first embodiment described below, the carbon nanotube web 3 is processed into a carbon nanotube twisted yarn 5 as an example of the carbon nanotube collected product.

To process the carbon nanotube web 3 into a carbon nanotube twisted yarn 5, as shown in FIG. 1, the carbon nanotube web 3 that was allowed to run on the tension roller 22 is drawn from the tension roller 22 so as to pass on the tension roller 22.

Then, after passing on the tension roller 22, the carbon nanotube web 3 is turned to twist the plurality of carbon nanotube single yarns 10 together (processing step). A carbon nanotube twisted yarn 5 is produced in this manner.

The carbon nanotube twisted yarn 5 has an external diameter of, for example, 5 μm or more, preferably 30 μm or more, and for example, 80 μm or less, preferably 60 μm or less, even more preferably 40 μm or less.

The carbon nanotube twisted yarn 5 has a bulk density of, for example, 0.6 g/cm$^3$ or more, preferably more than 0.6 g/cm$^3$, even more preferably 0.8 g/cm$^3$ or more, and for example, 2.0 g/cm$^3$ or less.

(3) Apparatus for Producing a Carbon Nanotube Web

The method for producing a carbon nanotube twisted yarn 5 is conducted continuously, for example, as shown in FIG. 1, with a spinning apparatus 20 as an example of the apparatus for producing a carbon nanotube web. The spinning apparatus 20 includes a web production unit 21 and a spinning unit 23.

The web production unit 21 is disposed at the rear side portion of the spinning apparatus 20, and is configured to draw out the carbon nanotube web 3 from the carbon nanotube array 2 continuously.

The web production unit 21 includes a substrate 1 on which the carbon nanotube array 2 is disposed, a drawing device (not shown), the above-described takeup shaft 25, and the above-described tension roller 22.

The substrate 1 is flexible, and has an elongated flat belt shape. The carbon nanotube array 2 is disposed on the substrate 1 so as to extend in front-back direction. The movement of the substrate 1 in left-right directions is restricted in the web production unit 21.

The takeup shaft 25 is disposed at the lower side of the front end portion of the substrate 1. The front end portion of the substrate 1 is fixed onto the circumferential face of the takeup shaft 25.

The tension roller 22 is disposed at the front side relative to the front end portion of the carbon nanotube array 2 in spaced apart relation.

The spinning unit 23 is disposed at the lower side relative to the tension roller 22 in spaced apart relation, and includes a converging portion 26 and a collecting portion 24.

The converging portion 26 is disposed at the lower side relative to the tension roller 22 in spaced apart relation, and includes a support plate 27 and a pair of shafts 28.

The support plate 27 has a substantially rectangular board shape extending in the left-right direction when it is seen from the front side. The pair of shafts 28 are disposed on the front side of the support plate 27, in slightly spaced-apart relation from each other in left-right direction. The shaft 28 has a substantially cylindrical shape extending in the front-back direction, and is supported by the support plate 27 so as to be relatively rotatable around its axis.

The collecting portion 24 is disposed at the lower side relative to the converging portion 26 in spaced apart relation. The collecting portion 24 includes a rotating portion 30, a reel shaft 29, and a rotating shaft 31.

The rotating portion 30 substantially has a U-shape which opens toward the upper side when it is seen from the front side. The reel shaft 29 is disposed between the right-side wall and left-side wall of the rotating portion 30. The reel shaft 29 has a substantially cylindrical shape extending in the left-right direction and is rotatably supported by both the right-side wall and left-side wall of the rotating portion 30.

The rotating shaft 31 is disposed at the lower side relative to the rotating portion 30. The rotating shaft 31 has a substantially cylindrical shape extending in the up-down direction, and its upper end portion is fixed to the center of the lower wall of the rotating portion 30 in left-right direction. Thereby, the rotating portion 30 may rotate around the rotating shaft 31, namely, around an axis line along the up-down direction as its rotational center.

In such a spinning apparatus 20, the carbon nanotubes 4 of the rows 2A are drawn in parallel and simultaneously from the carbon nanotube array 2 to the front side by a drawing device which is not shown. Thereby, the plurality of carbon nanotube single yarns 10 are drawn from the carbon nanotube array 2 as a substantially sheet-shaped carbon nanotube web 3 including the plurality of carbon nanotube single yarns 10 arranged in parallel and along the left-right direction. That is, the spinning apparatus 20 includes the carbon nanotube web 3 at the time it is driven.

Then, the carbon nanotube web 3 is allowed to run about ¼ round in the circumferential direction of the tension roller 22 from the upper end portion to the front end portion of the tension roller 22. Thereafter, the carbon nanotube web 3 is drawn out from the tension roller 22 so as to pass the tension roller 22 and to the lower side, and allowed to pass between the pair of shafts 28.

Thereby, the carbon nanotube web 3, that is, the plurality of carbon nanotube single yarns 10 are bundled into a linear shape (yarn shape). Then, the lower end portion of the plurality of bundled carbon nanotube single yarns 10 are fixed to the reel shaft 29 of the collecting portion 24.

At this moment, a tension is applied by the tension roller 22 to the carbon nanotube web 3 between the carbon nanotube array 2 and the tension roller 22, and between the tension roller 22 and the collecting portion 24.

Then, driving force is provided to the tension roller 22, the takeup shaft 25, the reel shaft 29, and the rotating shaft 31. Thereby, the tension roller 22, the takeup shaft 25, and the reel shaft 29 rotate clockwise when it is seen from the left side, and the rotating portion 30 rotates clockwise when viewed from the top.

Then, the carbon nanotube web 3 is pulled, drawn, and conveyed at the above-described drawing speed from the carbon nanotube array 2 by the rotation of the tension roller 22 and the reel shaft 29, and the substrate 1 is conveyed by the rotation of the takeup shaft 25 at the above-described moving speed. That is, the tension roller 22 and the reel shaft 29 function as a conveyer unit that draws and conveys the carbon nanotube web 3.

In this manner, the drawing position P of the carbon nanotube web 3 is kept at the same position in the drawing direction D.

Then, the substrate 1 feeds the carbon nanotube array 2 at the drawing position P continuously, and after passing the drawing position P, is wound up by the takeup shaft 25. The takeup shaft 25 is configured to move to the lower side along with the winding up of the substrate 1.

Meanwhile, the carbon nanotube web 3 is continuously drawn from the carbon nanotube array 2 at the drawing position P.

Then, the carbon nanotube web 3 is sent out to the lower side from the tension roller 22 after passing the tension roller 22, passes the pair of shafts 28 and bundled by the converging portion 26. Thereafter, by the rotation of the rotating shaft 31, it is twisted while turning clockwise when viewed from the top, and moves toward the lower side, and wound up by the reel shaft 29.

At this moment, the rotational speed (peripheral speed) of the rotating portion 30 is, for example, 1000 rpm or more, preferably 2000 rpm or more, and for example, 5000 rpm or less, preferably 4000 rpm or less.

In the above-described manner, the carbon nanotube web 3 is produced continuously, and then thereafter processed into the carbon nanotube twisted yarn 5.

Such a carbon nanotube twisted yarn 5 is used for various industrial products such as a textile (sheet) for which a carbon fiber is used, and a conductive line material for electric apparatuses (for example, a motor, a transformer, and a sensor).

Figure 10:
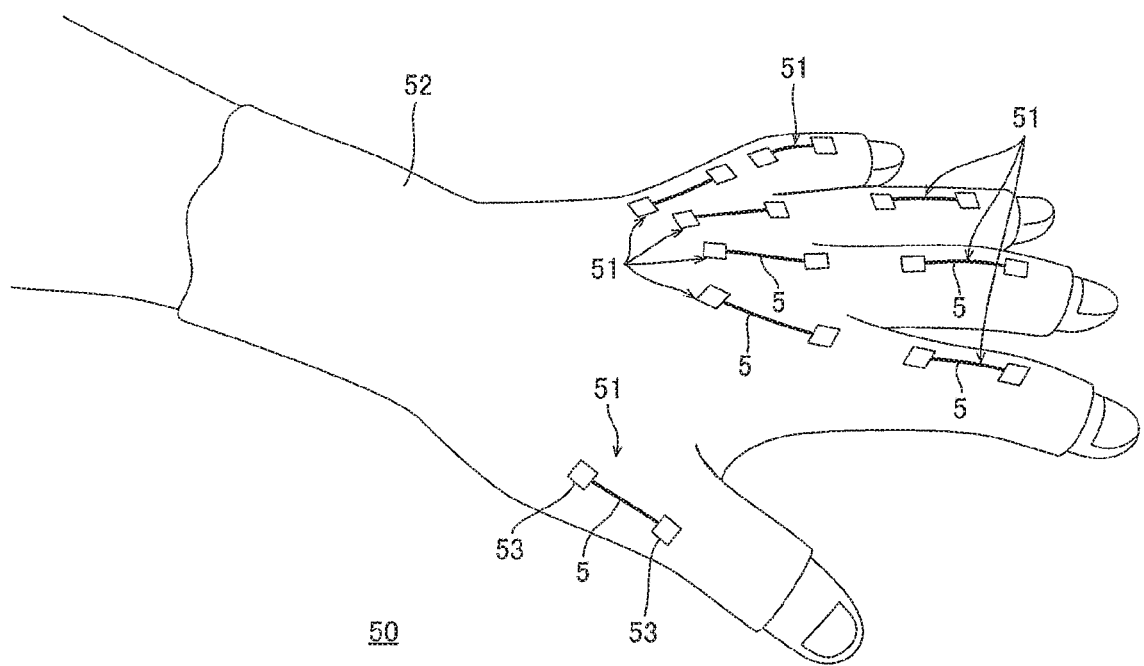
FIG. 10 is a schematic diagram illustrating the configuration of a wearable sensor including the carbon nanotube twisted yarn or collected product shown in FIG. 1.

To be specific, the carbon nanotube twisted yarn 5 is used for a wearable sensor 50, as shown in FIG. 10. The wearable sensor 50 is configured to detect movement of the hands of a testee (for example, stretching and contracting of the fingers), and includes an attachment portion 52, a sensor unit 51 having carbon nanotube twisted yarns 5, and a sensor main body (not shown).

The attachment portion 52 is formed into a glove-like shape from an elastic resin material or knit material. The attachment portion 52 can be attached to the hands of the testee.

The plurality of sensor units 51 are included in correspondence with joints of the fingers of the testee. The sensor unit 51 includes a pair of electrode pads 53 and the carbon nanotube twisted yarn 5.

The pair of electrode pads 53 are disposed in spaced-apart relation to each other at portions of the attachment portion 52. The pair of electrode pads 53 are provided on the attachment portion 52 so that they make contact with the fingers of the testee while the wearable sensor 50 is attached on the hands of the testee. The electrode pads 53 are electrically connected to the sensor main body through wires, although not shown.

The carbon nanotube twisted yarn 5 is provided across the pair of electrode pads 53, and electrically connects the pair of electrode pads 53.

When the hands are moved, stretching and contracting of the fingers are detected by a sensor main body (not shown) through the pair of electrode pads 53 and the carbon nanotube twisted yarn 5 as changes in resistance between the pair of electrode pads 53 through wires.

2. Operations and Effects

[1] The carbon nanotube web 3 is drawn out, as shown in FIG. 3B and FIG. 3C, while being oscillated in left-right directions toward the front side from the carbon nanotube array 2.

However, differences in density may be caused in portions of the carbon nanotube array 2 due to excessively large granular body 9A of the catalyst layer 9, and deficient wetting of the catalyst layer 9 from partial stains on the substrate 1.

This causes larger intervals between the adjacent carbon nanotubes 4 where the density is relatively small in the carbon nanotube array 2, and therefore the carbon nanotube web 3 cannot be drawn out excellently, and the carbon nanotube array 2 may partially remain on the substrate 1 without being separated from the substrate 1.

In this case, there are disadvantages in that homogenous density cannot be ensured on portions of the carbon nanotube web 3, and the carbon nanotube array 2 remained on the substrate 1 may attach the carbon nanotube web 3 that had been drawn out.

Meanwhile, when the carbon nanotube web 3 is drawn out from the carbon nanotube array 2 while being oscillated in left-right directions, the oscillating of the carbon nanotube web 3 affect the drawing position P of the carbon nanotube web 3 from the carbon nanotube array 2 through the plurality of carbon nanotube single yarns 10.

Then, even if the carbon nanotube array 2 partially include a portion with a small density, at the drawing position P of the carbon nanotube web 3, the plurality of carbon nanotubes 4 reliably make contact with the surrounding carbon nanotubes 4, in particular, with the carbon nanotubes 4 that are adjacent to each other in left-right directions.

In this manner, the carbon nanotubes 4 adjacent to each other affect to be close to each other at the drawing position P of the carbon nanotube web 3, and the plurality of carbon nanotubes 4 can be drawn from the carbon nanotube array 2 stably.

Thus, the carbon nanotube web 3 can be made homogenous, and the carbon nanotube array 2 can be suppressed from remaining on the substrate 1, and production efficiency of the carbon nanotube web 3 can be improved.

[2] After the carbon nanotube web 3 is allowed to contact the tension roller 22, as shown in FIG. 3B and FIG. 3C, the tension roller 22 is oscillated in left-right directions. The carbon nanotube web 3 can be stably and reliably oscillated in this manner.

[3] The tension roller 22 is a roller having a cylindrical shape. Thus, as shown in FIG. 3A, the carbon nanotube web 3 can be allowed to make contact along with the circumferential face of the tension roller 22.

As a result, the contact area between the carbon nanotube web 3 and the tension roller 22 can be improved. In this manner, even if the tension roller 22 is oscillated while the carbon nanotube web 3 is making contact with the tension roller 22, the carbon nanotube web 3 on the tension roller 22 can be reliably suppressed from moving.

[4] The carbon nanotube web 3 is processed after passing the tension roller 22 without being processed, as shown in FIG. 1.

That is, between the drawing position P of the carbon nanotube web 3 and the tension roller 22, the plurality of carbon nanotube single yarns 10 on the carbon nanotube web 3 are arranged in parallel in the direction intersecting (crossing) the extension direction of the carbon nanotube single yarn 10, and this state is substantially maintained.

Then, the carbon nanotube web 3 is processed after passing the tension roller 22, and the tension roller 22 can prevent the force due to the processing to affect the drawing position P of the carbon nanotube web 3. As a result, stable drawing of the carbon nanotube web 3 can be ensured.

[5] The carbon nanotube web 3 is smoothly processed into a carbon nanotube twisted yarn 5, as shown in FIG. 1, by a simple method of twisting together. Thus, productivity of the carbon nanotube twisted yarn 5 can be improved.

[6] In the spinning apparatus 20, as shown in FIG. 1, the tension roller 22 making contact with the carbon nanotube web 3 makes reciprocative movement in left-right directions, and the reel shaft 29 pulls the carbon nanotube web 3.

In this manner, the carbon nanotube web 3 is continuously drawn from the carbon nanotube array 2 while being oscillated in the movement direction of the tension roller 22.

Thus, homogenized carbon nanotube web 3 is continuously produced, and remaining of the carbon nanotube array 2 on the substrate 1 can be suppressed, and production efficiency of the carbon nanotube web 3 can be improved.

3. Second Embodiment

Figure 4A:
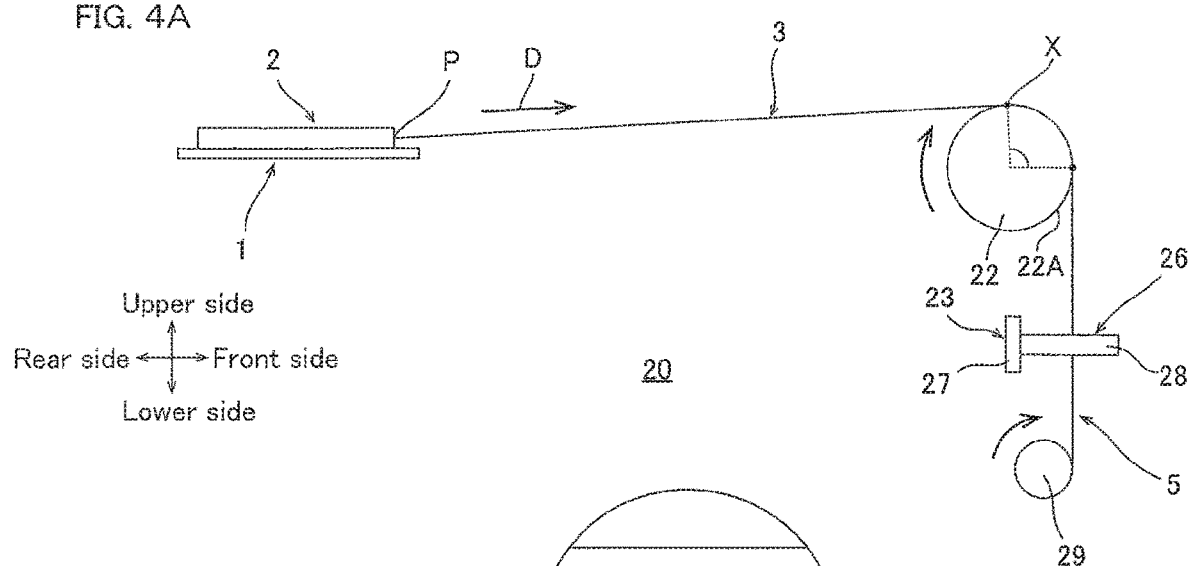
FIG. 4A is a schematic diagram illustrating the configuration of the spinning apparatus as a second embodiment of the apparatus for producing a carbon nanotube web of the present invention.
Figure 4B:
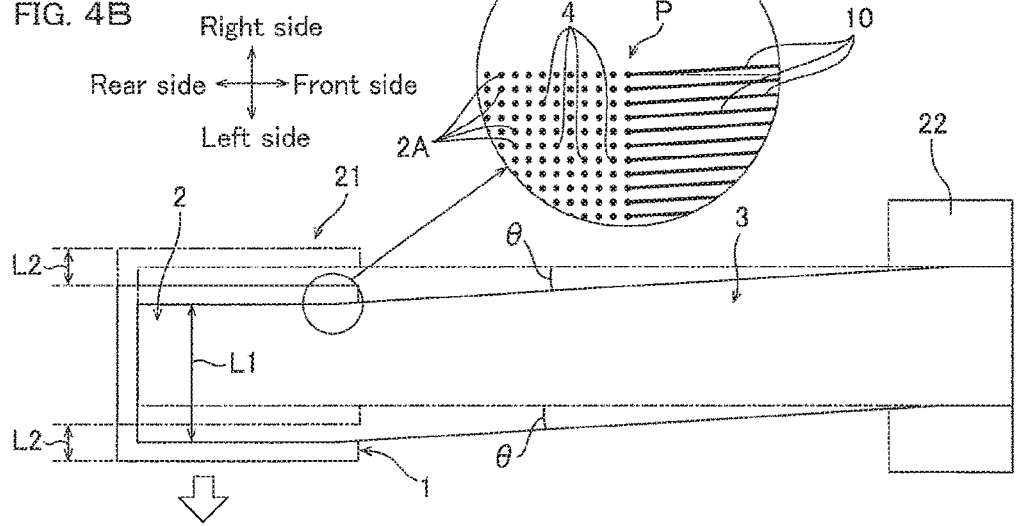
FIG. 4B is a plan view of the spinning apparatus shown in FIG. 4A, illustrating a status in which the substrate is moved to the left side.
Figure 4C:
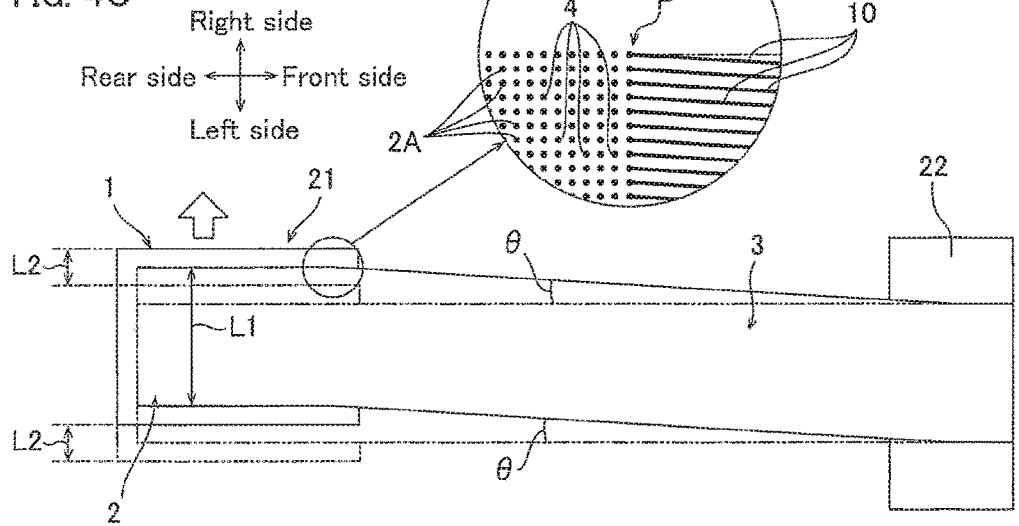
FIG. 4C is a plan view of the spinning apparatus shown in FIG. 4A, illustrating a status in which the substrate is moved to the right side.

Next, the second embodiment of the present invention is described with reference to FIG. 4A to FIG. 4C. In the second embodiment, the same reference numerals are given to the members same as those of the above-described first embodiment, and descriptions thereof are omitted.

In the first embodiment, as shown in FIG. 1, the substrate 1 has an elongated flat belt shape, and is wound up by the takeup shaft 25 after passing the drawing position P in the drawing step of the carbon nanotube web 3. However, the present invention is not limited thereto, and in the second embodiment, the substrate 1 does not have to be wound up in the drawing step of the carbon nanotube web 3.

In this case, the shape of the substrate 1 is not particularly limited, and the substrate 1 does not have to be flexible.

In the first embodiment, as shown in FIG. 3B and FIG. 3C, in the drawing step of the carbon nanotube web 3, the movement of the substrate 1 in left-right directions is restricted, and the tension roller 22 makes reciprocative movement in left-right directions. However, the present invention is not limited thereto, and in the second embodiment, as shown in FIG. 4B and FIG. 4C, in the drawing step of the carbon nanotube web 3, the movement of the tension roller 22 in left-right directions is restricted, and the substrate 1 makes reciprocative movement in left-right directions.

To be specific, the substrate 1 continuously moves so as to reciprocate between the first position (ref: solid line in FIG. 4B), the relatively leftmost side, and the second position (ref: solid line in FIG. 4C), the relatively rightmost side at the above-described moving amount L2 and the moving speed.

That is, in the step of drawing the carbon nanotube web 3, the substrate 1 is oscillated in left-right directions while the carbon nanotube web 3 is in contact with the tension roller 22.

In this manner as well, the carbon nanotube web 3 is stably and reliably oscillated.

Such a spinning apparatus 20 according to the second embodiment includes a web production unit 21 and a spinning unit 23. The web production unit 21 includes a substrate 1 supporting the carbon nanotube array 2, a drawing device (not shown), and a tension roller 22.

As described above, the shape of the substrate 1 is not particularly limited, and can make reciprocative movement in left-right directions (oscillatable). Movement in left-right directions of the tension roller 22 is restricted in the web production unit 21.

In the spinning apparatus 20, while the carbon nanotube web 3 is in contact with the tension roller 22, the substrate 1 makes reciprocative movement in left-right directions, and the reel shaft 29 and the tension roller 22 convey the carbon nanotube web 3.

Thus, the carbon nanotube web 3 is drawn out from the carbon nanotube array 2 continuously while being oscillated in left-right directions.

As a result, homogenized carbon nanotube web 3 can be produced continuously, and remaining of the carbon nanotube array 2 on the substrate 1 can be suppressed, and production efficiency of the carbon nanotube web 3 can be improved.

Such a second embodiment also achieves the above-described operations and effects of the first embodiment.

4. Third Embodiment

Next, the third embodiment of the present invention is described with reference to FIG. 5A and FIG. 5B. In the third embodiment, the same reference numerals are given to the members same as those of the above-described first embodiment, and descriptions thereof are omitted.

In the first embodiment, as shown in FIG. 1, the carbon nanotube web 3 is processed into the carbon nanotube twisted yarn 5, but in the third embodiment, the carbon nanotube web 3 is processed into a carbon nanotube stacked sheet 6 as an example of the carbon nanotube collected product, as shown in FIG. 5B.

Figure 5A:
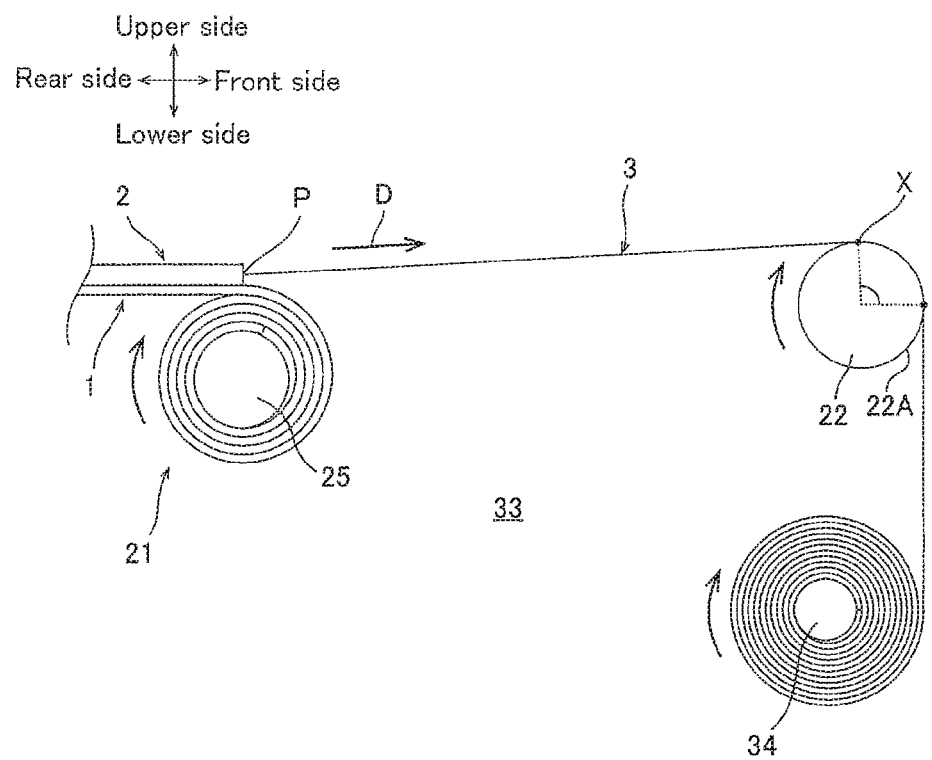
FIG. 5A is a schematic diagram illustrating the configuration of a sheet manufacturing apparatus as a third embodiment of the apparatus for producing a carbon nanotube web of the present invention.
Figure 5B:
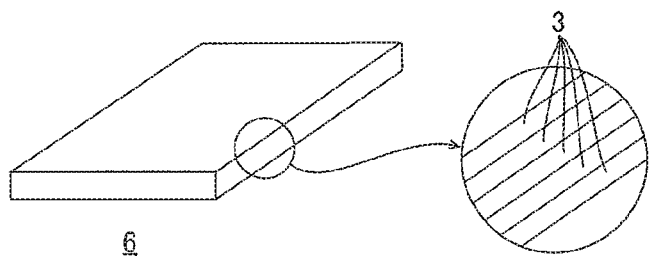
FIG. 5B is a perspective view of a carbon nanotube stacked sheet manufactured by the sheet manufacturing apparatus shown in FIG. 5A.

To process the carbon nanotube web 3 into a carbon nanotube stacked sheet 6, as shown in FIG. 5A, first, a winding shaft 34 as an example of the conveyer member is prepared.

The winding shaft 34 has a cylindrical shape extending in left-right directions. The winding shaft 34 is disposed at a downstream side in the conveyance direction of the carbon nanotube web 3 than the tension roller 22.

Then, after the carbon nanotube web 3 is drawn out from the carbon nanotube array 2 while being oscillated in left-right directions, it passes the tension roller 22, and then, the front end portion (free end portion) of the carbon nanotube web 3 is fixed onto the circumferential face of the winding shaft 34. Thereafter, the winding shaft 34 is turned clockwise when it is seen from the left side.

Then, the carbon nanotube web 3 is drawn out at the above-described drawing speed from the carbon nanotube array 2 and conveyed. Thereafter, the carbon nanotube web 3 is wound around consecutively on the circumferential face of the winding shaft 34.

Then, the carbon nanotube web 3 wound around the winding shaft 34 is cut by a cutting blade (for example, razor, cutter edge) in left-right directions, and is allowed to be removed from the winding shaft 34.

In this manner, as shown in FIG. 5B, a carbon nanotube stacked sheet 6 having a sheet shape is produced.

The carbon nanotube stacked sheet 6 includes a plurality of carbon nanotube webs 3 stacked in the thickness direction. The carbon nanotube webs 3 are stacked in a number of, for example, 5 or more, preferably 10 or more, and for example, 1000 or less, preferably 500 or less.

The carbon nanotube stacked sheet 6 has a thickness of, for example, 0.01 pin or more, preferably 5 μm or more, and for example, 500 pin or less, preferably 200 pin or less.

Such a carbon nanotube stacked sheet 6 can be produced continuously, as shown in FIG. 5A, by a sheet manufacturing apparatus 33. The sheet manufacturing apparatus 33 is the same as the spinning apparatus 20 except that the sheet manufacturing apparatus 33 has the winding shaft 34 instead of the spinning unit 23. That is, the sheet manufacturing apparatus 33 has the web production unit 21 and the winding shaft 34. The winding shaft 34 is disposed in spaced apart relation at the lower side relative to the tension roller 22.

With such a third embodiment, by a simple method of winding the carbon nanotube web 3 around the winding shaft 34 several times, and then cutting the carbon nanotube web 3, the carbon nanotube web 3 can be smoothly processed, and a carbon nanotube stacked sheet 6 including a plurality of stacked carbon nanotube webs 3 can be produced. Thus, productivity of the carbon nanotube stacked sheet 6 can be improved.

Such a third embodiment also achieves the above-described operations and effects of the first embodiment.

5. Fourth Embodiment

Figure 6:
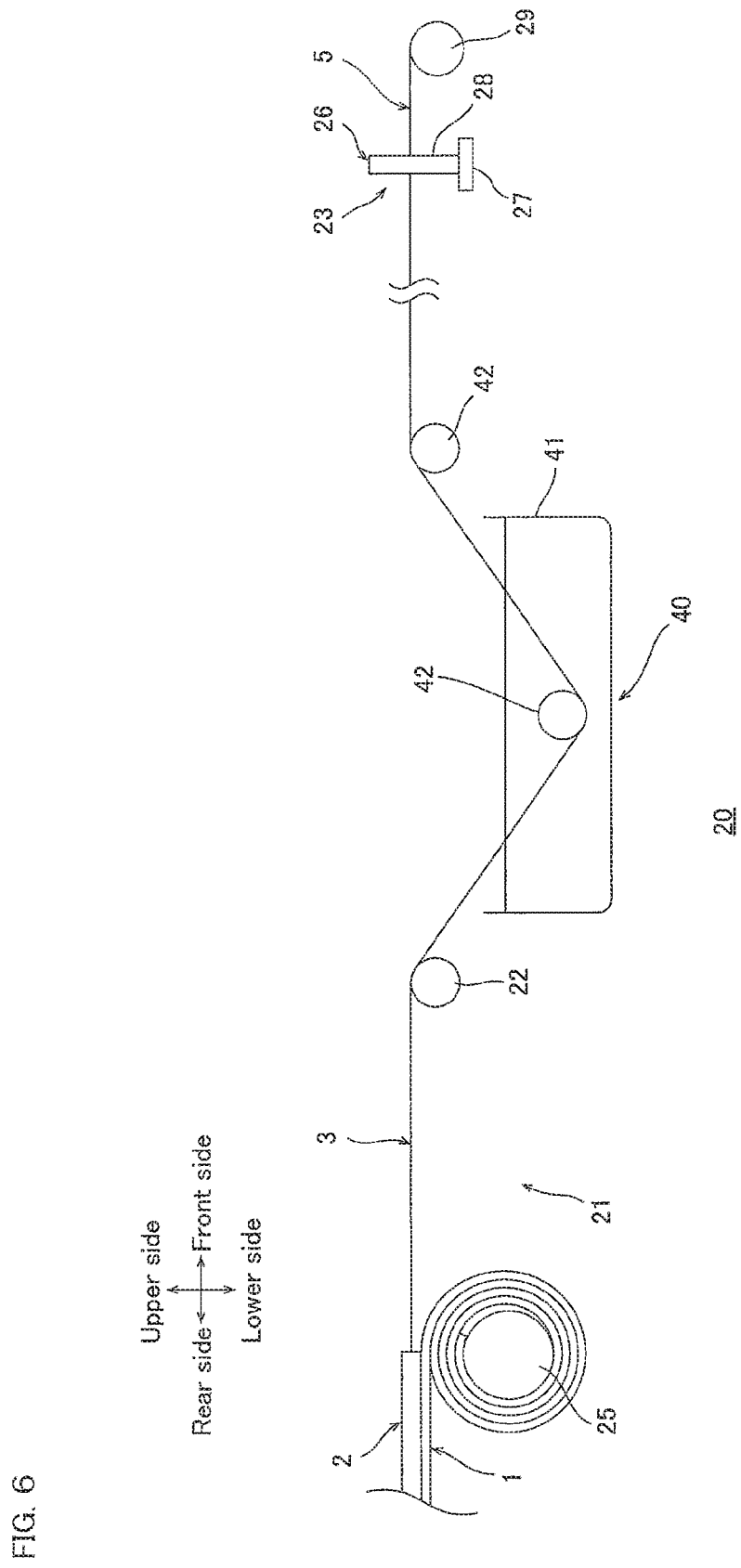
FIG. 6 is a schematic diagram illustrating the configuration of a fourth embodiment of the apparatus for producing a carbon nanotube web of the present invention.

Next, with reference to FIG. 6, fourth embodiment of the present invention is described. In the fourth embodiment, the same reference numerals are given to the members same as those of the above-described first embodiment, and descriptions thereof are omitted.

In the fourth embodiment, as shown in FIG. 6, after passing the tension roller 22, the carbon nanotube web 3 is immersed in a volatile liquid.

Examples of the volatile liquid include water and organic solvents, and preferably organic solvents are used. Examples of the organic solvent include lower (C1 to 3) alcohols (for example, methanol, ethanol, propanol), ketones (for example, acetone), ethers (for example, diethylether, tetrahydrofuran), alkylesters (for example, ethyl acetate), halogenized aliphatic hydrocarbons (for example, chloroform, dichloromethane), and polar aprotic solvents (for example, N-methylpyrrolidone, dimethylformamide).

Of such volatile liquid, preferably, lower alcohols, even more preferably ethanol is used. These examples of volatile liquid may be used singly or in a combination of two or more.

Microparticles may be dispersed in a volatile liquid, and resin materials may be dissolved therein.

Examples of the microparticles include organic microparticles (for example, silicone microparticles, acrylic microparticles, and urethane microparticles), inorganic microparticles (for example, silica, titanium oxide, calcium carbonate), metal microparticles (for example, gold microparticles, silver microparticles, and copper microparticles), and carbon microparticles (for example, and carbon black).

Examples of the resin material include thermoplastic resin (for example, polyester resin, polycarbonate resin, fluorine resin), and thermosetting resin (for example, silicone resin, epoxy resin, and urethane resin).

In such a case, the spinning apparatus 20 includes an immersion unit 40 between the tension roller 22 and the converging portion 26.

The immersion unit 40 includes an immersion tank 41 and a plurality of shaft members 42. The immersion tank 41 has a substantially box shape opening toward the upper side, and the above-described volatile liquid is reserved therein.

The plurality of shaft members 42 are disposed in a manner such that the carbon nanotube web 3 is immersed in the volatile liquid in the immersion tank 41.

With the fourth embodiment, the carbon nanotube web 3 is immersed in the volatile liquid after the carbon nanotube web 3 passed the tension roller 22. Then, by vaporizing the volatile liquid, coagulation is caused among the plurality of carbon nanotubes 4 in the carbon nanotube single yarn 10, and coagulation is caused among the plurality of carbon nanotube single yarns 10. As a result, the density of the carbon nanotube web 3 can be improved.

The fourth embodiment also achieves the above-described operations and effects of the first embodiment.

The sheet manufacturing apparatus 33 may also include the immersion unit 40.

6. Modified Example

In the first embodiment to fourth embodiment, the circumferential face 22A of the tension roller 22 is smooth surface without unevenness. In the modified example, the circumferential face 22A of the tension roller 22 preferably has bumps and depressions as shown in FIG. 7A and FIG. 7B.

To be specific, the circumferential face 22A of the tension roller 22 is provided with a plurality of bumps 45, and the circumferential face 22A of the tension roller 22 is formed to have an uneven surface.

The plurality of bumps 45 are disposed at portions of the circumferential face 22A of the tension roller 22 where the carbon nanotube web 3 is disposed.

For example, as shown in FIG. 7A, the plurality of bumps 45 are uniformly disposed on the entire periphery (portion between the left end portion and the right end portion) of the circumferential face 22A of the tension roller 22 except for the both left-right end portions so as to correspond to the entire left-right directions of the carbon nanotube web 3.

In this case, the plurality of bumps 45 include a row 45 A, in which a plurality of bumps 45 are arranged in the circumferential direction of the tension roller 22 in spaced apart relation in left-right directions.

The interval between the plurality of rows 45A is, for example, $\frac{1}{100}$ or more and $\frac{1}{10}$ or less of the moving amount L2 of the tension roller 22.

The plurality of bumps 45 may only include, as shown in FIG. 7B, a pair of rows 45A in spaced apart relation in left-right directions so as to correspond to the both left and right ends of the carbon nanotube web 3.

Each of the plurality of bumps 45 protrudes from the circumferential face 22A of the tension roller 22 to the external side in the radius direction, and has a substantially spherical shape. The bumps 45 have a height of, for example, 0.5 mm or more and below 1 mm.

With the circumferential face 22A of the tension roller 22 having the plurality of bumps 45 in this manner, when the carbon nanotube web 3 is disposed on the circumferential face 22A of the tension roller 22, the plurality of bumps 45 enter between the plurality of carbon nanotube single yarns 10 in the carbon nanotube web 3.

In this manner, even if the tension roller 22 or the substrate 1 is oscillated, lateral slippage of the carbon nanotube web 3 on the tension roller 22 can be suppressed. Thus, homogeneity of the carbon nanotube web 3 can be reliably ensured.

As shown in FIG. 7C, the circumferential face 22A of the tension roller 22 may have an inclined face 46 where the carbon nanotube web 3 is disposed.

The inclined face 46 is disposed on the entire periphery (portion between the left end portion and the right end portion) excluding the both left and right end portions of the circumferential face 22A of the tension roller 22. The inclined face 46 is inclined toward the external side in the radius direction of the tension roller 22 as it approaches the center in the left-right directions of the tension roller 22. That is, the inclined face 46 inclines as it approaches the inner side in left-right directions so as to face the external side in the contact direction with the carbon nanotube web 3. In this manner, the tension roller 22 has a tapered shape, with its diameter decreasing from the center portion in left-right directions toward the outside in left-right directions.

When the tension roller 22 or the substrate 1 is oscillated while the carbon nanotube web 3 is in contact with the tension roller 22, the carbon nanotube web 3 may gather at the inner side in left-right directions, in which oscillation is more constrained.

However, in the modified example, the tension roller 22 has the inclined face 46, and therefore when the tension roller 22 or the substrate 1 is oscillated, gathering of the carbon nanotube web 3 to the center portion of the tension roller 22 in left-right directions can be suppressed.

Furthermore, as shown in FIG. 7D and FIG. 7E, the circumferential face 22A of the tension roller 22 can be provided with an adjustment member, which can suitably adjust the contact area with the carbon nanotube web 3.

For example, a plurality of bar protrusions 47 as an example of the adjustment member can be provided on the circumferential face 22A of the tension roller 22.

The plurality of bar protrusions 47 are disposed on the entire periphery (portion between the left end portion and the right end portion) except for the both left and right end portions of the circumferential face 22A of the tension roller 22 so as to correspond to the entire portion in left-right directions of the carbon nanotube web 3.

Each of the plurality of bar protrusions 47 protrudes, as shown in FIG. 7D, toward the outside in the radius direction from the circumferential face 22A of the tension roller 22, and has a substantially arc shape when viewed from the side. The plurality of bar protrusions 47 extend in left-right directions, and are disposed in spaced apart relation from each other in the circumferential direction of the tension roller 22.

In this manner, the contact area between the tension roller 22 and the carbon nanotube web 3 can be suitably adjusted when the carbon nanotube web 3 is allowed to run on the circumferential face 22A of the tension roller 22, and fixation of the carbon nanotube web 3 on the tension roller 22 can be suppressed.

In the first embodiment to fourth embodiment, the tension roller 22 is an example of the contact member, but the contact member is not limited to the tension roller 22. For example, the contact member can be a plate member.

In the first embodiment to fourth embodiment, in the drawing step of the carbon nanotube web 3, the carbon nanotube web 3 is allowed to contact the tension roller 22, and oscillated in left-right directions by reciprocative movement in left-right directions of the tension roller 22. However, the present invention is not limited thereto.

For example, the carbon nanotube web 3 can also be drawn while oscillating the carbon nanotube web 3 in left-right directions from the carbon nanotube array 2 by keeping the carbon nanotube 4 of the carbon nanotube array 2 with a drawing device (not shown) to the front side, and drawing the carbon nanotube web 3 while moving the drawing device in reciprocation in left-right directions.

Figure 9A:
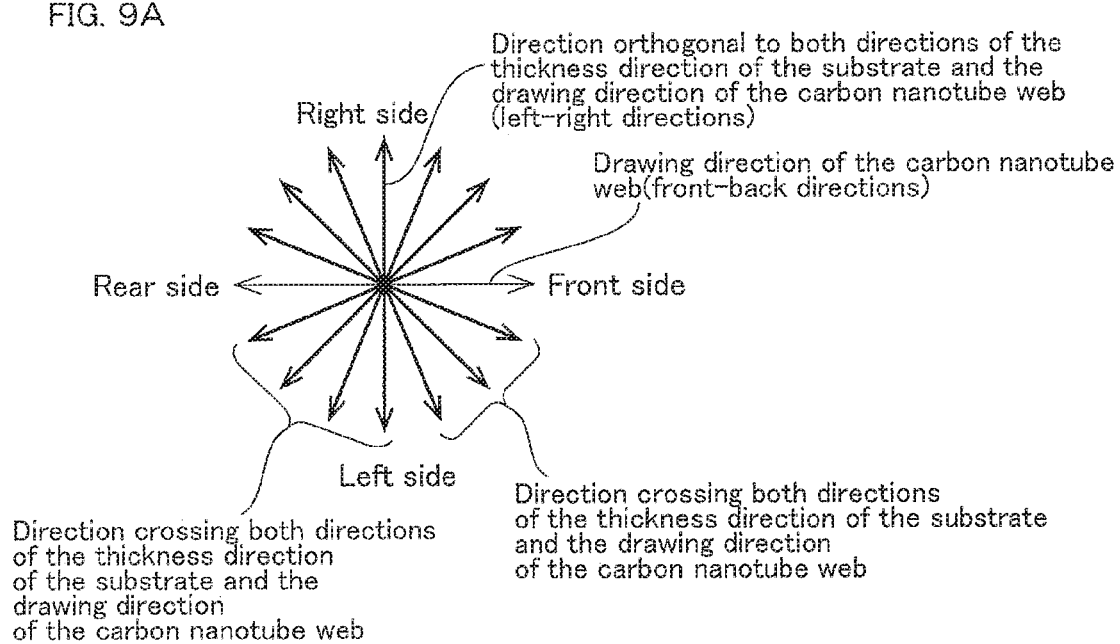
FIG. 9A is a diagram for illustrating the oscillating directions of the carbon nanotube web shown in FIG. 1, seeing the oscillating direction of the carbon nanotube web in the thickness direction of the substrate.
Figure 9B:
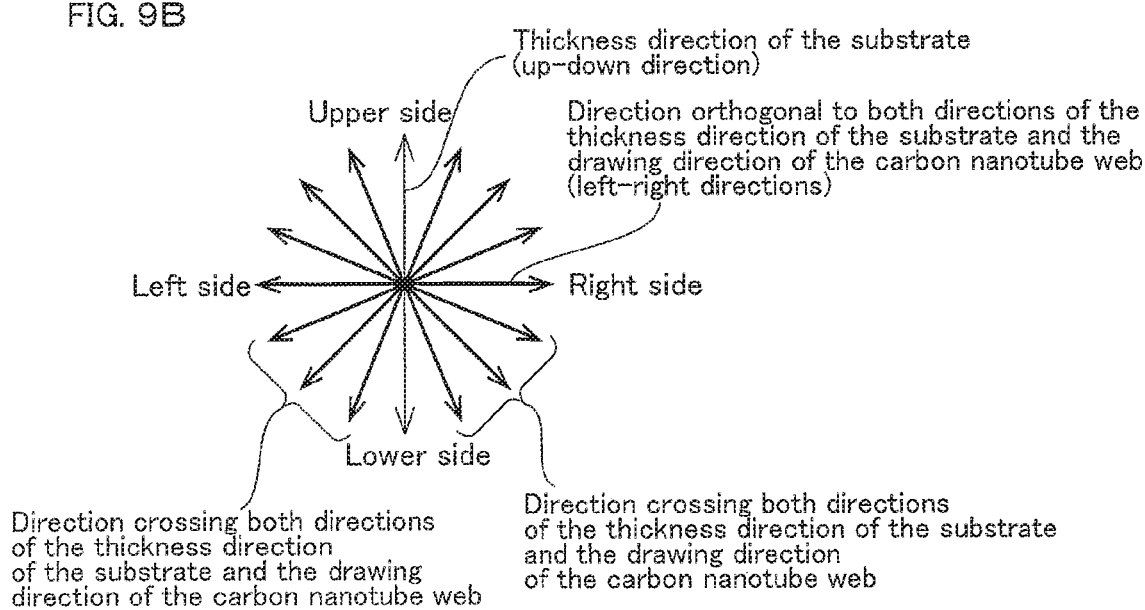
FIG. 9B is a diagram for illustrating the oscillating directions of the carbon nanotube web shown in FIG. 1, seeing the oscillating direction of the carbon nanotube web in the drawing direction of the carbon nanotube web.

In the first embodiment to fourth embodiment, in the drawing step, the tension roller 22 makes reciprocative movement in left-right directions to oscillate the carbon nanotube web 3 in left-right directions. However, as shown in FIG. 9A and FIG. 9B, the oscillating direction of the carbon nanotube web 3 is not particularly limited as long as it intersects (crosses) the both thickness direction of the substrate 1 and the drawing direction D of the carbon nanotube web 3.

That is, the oscillating direction of the carbon nanotube web 3 includes at least vector components in left-right directions.

Figure 8A:
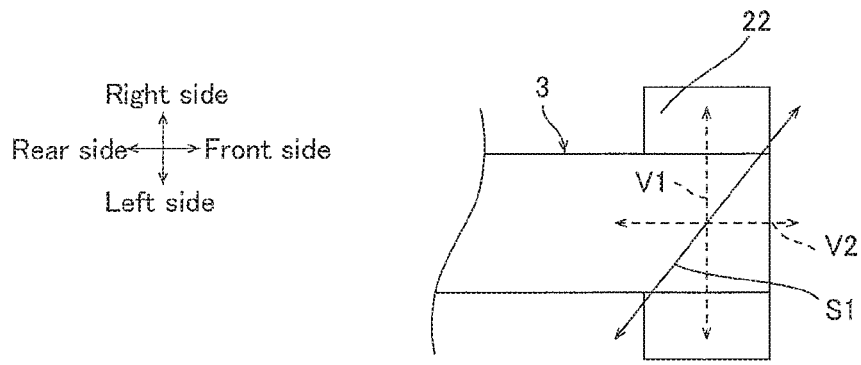
FIG. 8A is a diagram for illustrating a vector component in the case where the oscillating direction of the carbon nanotube web shown in FIG. 1 is the direction connecting the front-right side and the rear-left side.

For example, as shown in FIG. 8A, when the tension roller 22 makes reciprocative movements in directions connecting the right-front side and left-rear side to oscillate the carbon nanotube web 3 in the directions connecting the right-front side and the left-rear side, the oscillating direction S1 (specifically, vector based on oscillating of the carbon nanotube web 3) of the carbon nanotube web 3 is decomposed into a vector component V1 along left-right directions and a vector component V2 along front-back directions, and therefore the oscillating direction S1 includes the vector component V1 along left-right directions.

Figure 8B:
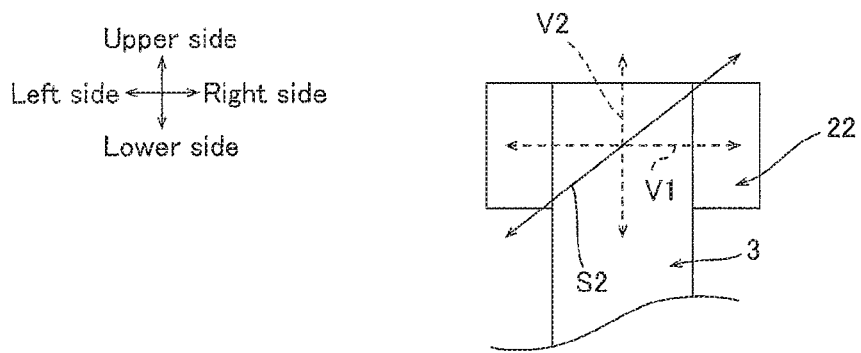
FIG. 8B is a diagram for illustrating a vector component in the case where the oscillating direction of the carbon nanotube web shown in FIG. 1 is the direction connecting the right-upper side and left-lower side.

Furthermore, as shown in FIG. 8B, when the tension roller 22 makes reciprocative movements in directions connecting the right-upper side and left-lower side to oscillate the carbon nanotube web 3 in the direction connecting the right-upper side and the left-lower side, the oscillating direction S2 (specifically, vector based on oscillating of the carbon nanotube web 3) of the carbon nanotube web 3 is decomposed into a vector component V1 along left-right directions, and a vector component V2 along up-down directions, and therefore the oscillating direction S2 includes the vector component V1 along left-right directions.

Examples of such oscillating direction of the carbon nanotube web 3 include, to be specific, as shown in FIG. 9A and FIG. 9B, left-right directions (direction orthogonal to both thickness direction of the substrate 1 and the drawing direction D of the carbon nanotube web 3), the direction connecting the right-upper side and the left-lower side, the direction connecting the left-upper side and the right-lower side, the direction connecting the right-rear side and the left-front side, and the direction connecting the left-rear side and the front-right side.

In the first embodiment, as shown in FIG. 1, the spinning apparatus 20 has the web production unit 21 and the spinning unit 23, and drawing of the carbon nanotube web 3 from the carbon nanotube array 2 and processing of the carbon nanotube web 3 into the carbon nanotube twisted yarn 5 are successively performed. However, the present invention is not limited thereto.

The drawing of the carbon nanotube web 3 from the carbon nanotube array 2 and the processing (spinning) of the carbon nanotube web 3 can be carried out in separate steps.

For example, as shown in FIG. 5A, the carbon nanotube web 3 can be drawn from the carbon nanotube array 2, wound up around the winding shaft 34, and thereafter the carbon nanotube web 3 drawn from the winding shaft 34 can be separately processed.

In the first embodiment, as shown in FIG. 1, the carbon nanotube web 3 is processed into the carbon nanotube twisted yarn 5. However, the present invention is not limited thereto, and the carbon nanotube web 3 can be processed into a carbon nanotube untwisted yarn as an example of the carbon nanotube collected product.

In this case, for example, the carbon nanotube web 3 (the plurality of carbon nanotube single yarns 10) is allowed to pass through a die having holes, for example, according to the method described in Japanese Unexamined Patent Publication No. 2014-169521.

These modified examples also achieve the same operations and effects of the above-described first embodiment.

The first embodiment to fourth embodiment, and the modified example can be suitably combined.

EXAMPLES

The present invention is further described in detail based on Examples below. However, the present invention is not limited to Examples. The specific numerical values of mixing ratio (content), physical property value, and parameter used in the description below can be replaced with the upper limit values (numerical values defined with "or less" or "below") or lower limit values (numerical values defined with "or more" or "more than") of the corresponding numerical values of mixing ratio (content), physical property value, and parameter described in "DESCRIPTION OF EMBODIMENTS" above.

Example 1

A silicon dioxide film was stacked on a stainless substrate (stainless steel substrate), and thereafter iron was vacuum evaporated as a catalyst layer on the silicon dioxide film. The substrate had an elongated flat belt shape, and had a length in elongation direction (vertical direction) of 10 m, and a length in width direction (lateral direction) of 20 mm. The substrate had a thickness of 50 μm.

Then, the substrate was heated to a predetermined temperature, and a source gas (acetylene gas) was applied to the catalyst layer. In this manner, a carbon nanotube array having a substantially rectangular shape when viewed from the top was formed on the substrate (preparation step).

In the carbon nanotube array, the plurality of carbon nanotubes extend substantially in parallel to each other, and aligned to be orthogonal (perpendicular) to the substrate. The carbon nanotube is a multi-walled carbon nanotube. The carbon nanotube had an average external diameter of about 12 nm, and an average length of about 300 μm, and the carbon nanotube array had a bulk density of about 40 mg/cm$^3$.

Then, the plurality of carbon nanotubes disposed at the front end portion of the carbon nanotube array are held all at once throughout its width with a drawing device, and pulled toward the front side.

In this manner, the carbon nanotube web is drawn out from the carbon nanotube array on the substrate. In the carbon nanotube web, the plurality of carbon nanotube single yarns are arranged in parallel in left-right direction. The carbon nanotube single yarn had an average diameter of about 60 nm to 80 nm.

Then, the carbon nanotube web is moved to the front side, and allowed to run on the circumferential face of the tension roller having bumps and depressions on circumferential face in clockwise when it is seen from the left side. At this moment, the carbon nanotube web is disposed on a range of the circumferential face of the tension roller, the range corresponding to the central angle of 90°.

The interval between the contact upstream end portion of the carbon nanotube web and the position at which the carbon nanotube web is drawn was 15 cm.

Then, the tension roller was turned clockwise when it is seen from the left side, and reciprocative movement in left-right directions (oscillated) was made at a speed of 100 mm/min. The moving amount of the tension roller was 1 mm to both of the left side and the right side, and the reciprocation time of the tension roller was 25 times/min.

In this manner, the carbon nanotube web was drawn at a speed of 500 mm/min while being oscillated in left-right directions. (drawing step).

At this moment, it was visually confirmed that the entire carbon nanotube array was separated from the substrate as the carbon nanotube web.

Comparative Example 1

A carbon nanotube web was prepared in the same manner as in Example 1, except that in the drawing step, the tension roller was not oscillated, and the carbon nanotube web was drawn out without being oscillated.

It was visually confirmed that the carbon nanotube array partially remained on the substrate in the drawing step.

While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

The method for producing a carbon nanotube web and the apparatus for producing a carbon nanotube web of the present invention can be suitably used for production of a carbon nanotube web used for various industrial products.

The method for producing a carbon nanotube collected product of the present invention can be suitably used for production of a carbon nanotube collected product used for various industrial products, in particular, production for a carbon nanotube twisted yarn and a carbon nanotube stacked sheet.

DESCRIPTION OF REFERENCE NUMERALS

1 substrate
2 carbon nanotube array
3 carbon nanotube web
4 carbon nanotube
5 carbon nanotube twisted yarn
6 carbon nanotube stacked sheet
10 carbon nanotube single yarn
20 spinning apparatus
22 tension roller
22A circumferential face of tension roller
33 sheet manufacturing apparatus
34 winding shaft

The invention claimed is:
1. A method for producing a carbon nanotube web, the method including the steps of:

preparing a carbon nanotube array disposed on a substrate, the carbon nanotube array comprising a plurality of carbon nanotubes vertically aligned relative to the substrate, and drawing a carbon nanotube web from the carbon nanotube array so that a plurality of carbon nanotube single yarns are arranged in parallel, wherein in the step of drawing a carbon nanotube web, the carbon nanotube web is allowed to contact a contact member, and the contact member or the substrate is oscillated from an initial position, the carbon nanotube web being oscillated in a direction crossing both the thicknessdirection of the substrate and the drawing direction of the carbon nanotube web, in the oscillating direction, the contact member or the substrate continuously moves so as to reciprocate between a first position and a second position, the first position being one side of the initial position, and the second position being on an opposite side of the initial position, the carbon nanotube web while the contact member or the substrate is at the initial position is defined as a base carbon nanotube web, the carbon nanotube web while the contact member or the substrate in the first position or the second position is defined as an oscillated carbon nanotube web, and the carbon nanotube single yarns of the oscillated carbon nanotube web are oscillated from the carbon nanotube single yarns of the base carbon nanotube web so as to be tilted relative to front-back directions which are orthogonal to the thickness direction and the oscillating direction with a drawing position as a fulcrum.

2. The method for producing a carbon nanotube web according to claim 1, wherein an oscillating angle formed by the carbon nanotube single yarns of the base carbon nanotube web and the carbon nanotube single yarns of the oscillated carbon nanotube web is 0.1° or more and 6° or less.

3. The method for producing a carbon nanotube web according to claim 1, wherein in the contact member, a surface that makes contact with the carbon nanotube web has bumps and depressions.

4. The method for producing a carbon nanotube web according to claim 1, wherein in the contact member, a portion that makes contact with the carbon nanotube web has an inclined face that inclines toward the outer side in the contact direction with the carbon nanotube web as it approaches the inner side in the oscillating direction.

5. The method for producing a carbon nanotube web according to claim 1, wherein the contact member is a roller having a cylindrical shape.

6. The method for producing a carbon nanotube web according to claim 1, wherein the first position is one extreme from the initial position and the second position is the other extreme from the initial position.

7. A method for producing a carbon nanotube collected product, including processing the carbon nanotube web produced by the method for producing a carbon nanotube web according to claim 1 after allowing the carbon nanotube web to pass the contact member.

8. The method for producing a carbon nanotube collected product according to claim 7, wherein in the step of processing the carbon nanotube web, the carbon nanotube web is twisted together to make a twisted yarn.

9. The method for producing a carbon nanotube collected product according to claim 7, wherein the step of processing the carbon nanotube web includes preparing a winding shaft having a cylindrical shape, winding the carbon nanotube web around the circumferential face of the winding shaft several times, and cutting the carbon nanotube web in the axis direction of the winding shaft, and forming the carbon nanotube web into a sheet shape.

10. The method for producing a carbon nanotube collected product according to claim 7, wherein in the step of processing the carbon nanotube web, the carbon nanotube web is immersed in a volatile liquid.

* * * * *